(12) United States Patent  
Beeco et al.

(10) Patent No.: US 8,649,257 B2  
(45) Date of Patent: Feb. 11, 2014

(54) SYSTEMS AND METHODS FOR LOCATING POWER NETWORK FAILURES ON A NETWORK

(75) Inventors: Bruce Dexter Beeco, Buford, GA (US); Ian Derrick Tabb, Dunwoody, GA (US)

(73) Assignee: Cox Communications, Inc., Atlanta, GA (US)

( * ) Notice: Subject to any disclaimer, the term of this patent is extended or adjusted under 35 U.S.C. 154(b) by 467 days.

(21) Appl. No.: 12/947,636

(22) Filed: Nov. 16, 2010

(65) Prior Publication Data

US 2011/0116387 A1 May 19, 2011

Related U.S. Application Data

(60) Provisional application No. 61/261,664, filed on Nov. 16, 2009.

(51) Int. Cl.
*G01R 31/08* (2006.01)
*G06F 1/00* (2006.01)
*G06F 11/00* (2006.01)

(52) U.S. Cl.
USPC .............. 370/216; 370/242; 713/340; 714/25

(58) Field of Classification Search
USPC ......... 370/216, 218, 241, 242, 245, 248, 250; 379/9.03, 9.04, 15.05, 32.09; 725/111, 725/129, 108; 714/4.1, 14, 25, 26; 713/300, 713/320, 321, 324, 340
See application file for complete search history.

(56) References Cited

U.S. PATENT DOCUMENTS

| | | | |
|---|---|---|---|
| 6,023,775 A * | 2/2000 | Fujii | 714/48 |
| 6,392,990 B1 * | 5/2002 | Tosey et al. | 370/218 |
| 6,711,135 B1 * | 3/2004 | Dziekan et al. | 370/242 |
| 7,289,449 B1 * | 10/2007 | Rubinstein et al. | 370/245 |
| 7,428,503 B1 | 9/2008 | Groff et al. | |
| 7,472,290 B2 * | 12/2008 | Diab et al. | 713/300 |
| 7,542,428 B1 * | 6/2009 | Johnson et al. | 370/241 |
| 7,551,851 B2 * | 6/2009 | Zirnheld et al. | 398/3 |
| 7,669,218 B1 | 2/2010 | Groff et al. | |
| 7,707,599 B1 | 4/2010 | Groff et al. | |
| 7,917,807 B2 * | 3/2011 | Groseclose et al. | 714/22 |
| 2004/0031059 A1 * | 2/2004 | Bialk et al. | 725/129 |
| 2004/0039960 A1 * | 2/2004 | Kassayan | 714/14 |
| 2004/0073818 A1 * | 4/2004 | Cheok et al. | 713/300 |
| 2004/0088589 A1 * | 5/2004 | Westerinen et al. | 713/300 |
| 2005/0021252 A1 | 1/2005 | Hui | |
| 2005/0041797 A1 | 2/2005 | Bellovin et al. | |
| 2006/0085832 A1 | 4/2006 | Groff et al. | |
| 2006/0143583 A1 | 6/2006 | Diab et al. | |
| 2008/0195881 A1 * | 8/2008 | Bernard et al. | 713/340 |
| 2009/0216881 A1 | 8/2009 | Lovy et al. | |
| 2012/0117399 A1 * | 5/2012 | Chan et al. | 713/320 |
| 2012/0120833 A1 | 5/2012 | Fraccalvieri et al. | |

* cited by examiner

*Primary Examiner* — Michael Thier
*Assistant Examiner* — Prince A Mensah
(74) *Attorney, Agent, or Firm* — Sutherland Asbill & Brennan LLP

(57) ABSTRACT

Systems and methods for locating a possible failure on a power network are provided. In one embodiment, a method may include determining that a possible power network failure exists based on a first group of network devices without battery back-up capabilities having an inactive status and a second groups of network devices with battery back-up capabilities having an active status on a communications network, wherein each of the network devices are adapted for receiving at least primary power from a power network; determining addresses for at least a portion of the first or the second groups of network devices; locating the addresses on a power network grid topology; and identifying at least one power network component or power network segment as a possible power network failure location based on locations of the at least a portion of the first or the second groups of network devices.

17 Claims, 22 Drawing Sheets

| Rollup Data | | | | | |
|---|---|---|---|---|---|
| Device | Local | CPE Online | CPE Count | % Online | % Offline |
| A | Non-local | 9 | 22 | 41% | 59% |
| A | Local | 0 | 0 | 0% | 0% |
| A | Total | 9 | 22 | 41% | 59% |
| B | Non-local | 9 | 22 | 41% | 59% |
| B | Local | 0 | 0 | 0% | 0% |
| B | Total | 9 | 22 | 41% | 59% |
| C | Non-local | 4 | 4 | 100% | 0% |
| C | Local | 3 | 4 | 75% | 25% |
| C | Total | 7 | 8 | 88% | 13% |
| D | Non-local | 2 | 11 | 18% | 82% |
| D | Local | 0 | 2 | 0% | 100% |
| D | Total | 2 | 13 | 15% | 85% |
| E | Non-local | 0 | 0 | 0% | 0% |
| E | Local | 4 | 4 | 100% | 0% |
| E | Total | 4 | 4 | 100% | 0% |
| F | Non-local | 0 | 0 | 0% | 0% |
| F | Local | 0 | 1 | 0% | 100% |
| F | Total | 0 | 1 | 0% | 100% |
| G | Non-local | 0 | 9 | 0% | 100% |
| G | Local | 2 | 2 | 100% | 0% |
| G | Total | 2 | 11 | 18% | 82% |
| H | Non-local | 0 | 6 | 0% | 100% |
| H | Local | 0 | 3 | 0% | 100% |
| H | Total | 0 | 9 | 0% | 100% |
| I | Non-local | 0 | 6 | 0% | 100% |
| I | Local | 0 | 0 | 0% | 0% |
| I | Total | 0 | 6 | 0% | 100% |
| J | Non-local | 0 | 0 | 0% | 0% |
| J | Local | 0 | 3 | 0% | 100% |
| J | Total | 0 | 3 | 0% | 100% |
| K | Non-local | 0 | 0 | 0% | 0% |
| K | Local | 0 | 3 | 0% | 100% |
| K | Total | 0 | 3 | 0% | 100% |

Ox.com :: Trending and Correlation System

Points of Interest > Active POI

POI Controls

Monitored Rule: Modulation-to-Error ratio, lower level (32)  Number of hours in past to display: 0  [Refresh]

POI Entries

| Element Id | Runtime | Device Type | Parent Element Id | Parent Device Type | GNIS Node | ICOMS Node | POI Type | Total Impacted Addresses | Local On/Off/ Total | Non-Local On/ Off/Total | % out | Parent % out |
|---|---|---|---|---|---|---|---|---|---|---|---|---|
| 0  2925076386 | 10/21/08 00:16:00 | Amp. | 2925076353 | tap | 132E057 | E057 | 1- critical | 10 | 0/0/0 | 2/8/10 | 80 | 83 |
| 1  2925074877 | 10/21/08 00:16:00 | Amp. | 2925018167 | Coaxial Splitter | 132E057 | E057 | 1- critical | 17 | 0/0/0 | 5/12/17 | 71 | 65 |

Details for Outage on Element Id: 2925076386 at Runtime of: 10/21/08 00:16:00

Device Outage Details

| Location | Device Type | Description | Tap POI | Network POI | Total Addresses |
|---|---|---|---|---|---|
| Outage | Amp. | 62/QQ-47 ((LE-121) 121) | N | N | 10 |
| Parent | | | | | |

Impacted Address Counts

| Monitored Addresses | | | Non-Monitored Addresses | |
|---|---|---|---|---|
| Local On | Local Off | Non-Local On | Non-Local Off | Local | Non-Local |

Affected Revenue Generating Unites (RGUs)

| Customer Type | Data RGU | Cable RGU | Telephone RGU | Other RGU |
|---|---|---|---|---|
| Residential | 9 | 8 | 9 | 3 |
| Business | 1 | 1 | 5 | 1 |

POI Links

| Link Type | Link URL |
|---|---|
| Remedy Ticket | Link to Remedy Ticket |

POI Nearby Locations

| Description | Address Information |
|---|---|
| Nearest Address | 23733 Oak St. in Lake Platte View, NE |
| Nearest Intersection | Oak St. and 2$^{nd}$ St. in Lake Platte View, NE |

Upstream Amplifiers (Click for Map)

- amplifier: 51/QQ-47 ((DA-81) BTD100 EXP 15A)
- amplifier: 52/QQ-47 ((LE-121) 121)
- optical_rode: E057 ((ON-61) ALS-VODE)
- Point of Interest

POI Service Addresses

| House ID | Node | Service Address | Type | Active Services | Status | RX level | TX level | MER level | Status |
|---|---|---|---|---|---|---|---|---|---|
| 1320244693 | E057 | 23912 Cedar Hollow Mall, Waterloo, NE 68069 | Business | Data Cable Phone (5) | ON | 1.2 | 40.9 | 31.3 | |
| 1320181508 | E057 | 23705 Oak St., Waterloo, NE 68069 | Resident | Data Cable Phone (1) | ON | 0 | 49 | 31.5 | |
| 1320181507 | E057 | 23707 Oak St., Waterloo, NE 68069 | Resident | Data Cable Phone (1) | ON | -6 | 55 | 31.8 | |
| 1320181505 | E057 | 23711 Oak St., Waterloo, NE 68069 | Resident | Data Phone (1) | ON | 2.3 | 42.7 | 30.8 | |
| 1320181504 | E057 | 23713 Oak St., Waterloo, NE 68069 | Resident | Data Cable | ON | -5.6 | 51.8 | 31.8 | |
| 1320181503 | E057 | 23715 Oak St., Waterloo, NE 68069 | Resident | Data Cable Phone (1) | ON | -9.3 | 54 | 31.5 | |
| 1320181502 | E057 | 23801 Oak St., Waterloo, NE 68069 | Resident | Data Cable Phone (1) | ON | -4.1 | 48 | 32.4 | |
| 1320181501 | E057 | 23803 Oak St., Waterloo, NE 68069 | Resident | Data Phone (1) | ON | -0.3 | 50.9 | 31.9 | |
| 1320181500 | E057 | 23805 Oak St., Waterloo, NE 68069 | Resident | Data Cable Phone (1) | ON | -9.7 | 46.4 | 31 | |
| 1320181499 | E057 | 23807 Oak St., Waterloo, NE 68069 | Resident | Data Cable Phone (1) | ON | 3.5 | 47 | 32.1 | |
| 1320181498 | E057 | 23809 Oak St., Waterloo, NE 68069 | Resident | Cable Phone (1) | N/A | 0 | 0 | 0 | |

SYSTEMS AND METHODS FOR LOCATING POWER NETWORK FAILURES ON A NETWORK

RELATED APPLICATIONS

This application claims the benefit of U.S. Provisional Application No. 61/261,664, entitled "Correlating Customer Information, Network Topology and Device Status Data to Identify Points of Interest and Non-Serial Device Failures in Non-Intelligent Networks," filed on Nov. 16, 2009, which is incorporated by reference in its entirety herein.

FIELD OF THE INVENTION

Aspects of the invention relate generally to network monitoring, and more particularly, to systems and methods for locating power network failures on a power network.

BACKGROUND OF THE INVENTION

With the advent of cable television networks and other content or communications networks, customers have grown accustomed to receiving a variety of content and services from numerous sources. In recent years, technology advances have enabled customers to receive an even greater variety of services through various networks. For example, modern cable service networks provide traditional video television programming, telephone services, high-speed Internet access, electronic mail services, video-on-demand, information services, and the like.

Unfortunately, from time-to-time, consumers of cable services experience a loss of communications with their network service providers. Losses of communications may be caused by a variety of problems. For example, a satellite downlink may be lost temporarily which causes a loss of communications across a vast service area. On the other hand, a coaxial cable may be damaged at a single home or other consumer location resulting in a loss of communications to a single consumer, or another network component, such as an amplifier, splitter, etc., may need servicing which adversely impacts downstream service and/or performance.

In order to provide quality network services and to maintain customer satisfaction, service providers must strive to restore lost communications as quickly and as efficiently as possible. Unfortunately, conventional systems and methods typically provide a network service provider with only a rough understanding of the area of lost communications, but do not provide detailed insight as to the nature of a given services outage and/or devices that are actually affected. As an example, most cable networks are inherently non-intelligent networks, many of which are based on Hybrid Fiber Coaxial ("HFC") networks, and are, thus, unable to provide detailed network status and/or health information that would otherwise be beneficial in assessing the status and health of the networks. Various network devices that make up the network may relay the signals they receive without communicating particular details regarding their health or status. Accordingly, network performance issues on a communications network can be difficult to identify and local or systemic outages can be difficult to pinpoint. In some instances, service interruptions may result from a failure outside of the communications network, but may still cause service issues to communications network hardware. For example, a power outage can affect a significant portion of communications network devices because they are typically powered by the power network. Therefore, identifying external failures allows rapid diagnosis of service issues, improves a communications network's quality of service, and reduces unnecessary service costs.

In many circumstances, a communications network services provider may be notified that a given node servicing 1,000 homes is experiencing services outages without receiving any real-time information as to the particular locations or nature of the outages. For example, a network services provider may only learn of network failure when notified via calls from individual customers regarding particular services outages. Under such circumstances, service providers often roll multiple technicians and service vehicles to respond to a given services outage when only a single technician and service vehicle would actually be needed. Accordingly, a significant amount of time and resources (e.g., customer service representatives, field service technicians, field service vehicles, mileage, gas, maintenance, etc.) may be exhausted to resolve a single faulty network device or specific network location that was otherwise unidentifiable. In addition to the potentially massive costs, inevitable delays in service color the customer's impression of the network's reliability and the network provider's responsiveness.

Therefore, a need exists for improved systems and methods for analyzing the health of networks and identifying potential failures in communications networks or power networks.

BRIEF DESCRIPTION OF THE INVENTION

Some or all of the above needs and/or problems may be addressed by certain embodiments of the invention. Embodiments of the invention may include systems and methods for locating a possible power network failure on a power network. In one embodiment a method for locating a possible failure in a power network is provided. The method may include: identifying a possible failure occurring on a power network based on activity statuses for multiple network devices in communications with a communications network and adapted to receive at least primary power from the power network; determining location information for at least a portion of the network devices; analyzing the location information with a grid topology for the power network; and identifying one or more potential failure locations on the power network based on the analysis.

According to another embodiment, a system for locating a possible power network failure on a power network is provided. The system may include memory storing computer-executable instructions and at least one processor in communication with the memory. The processor is operable to execute the computer-executable instructions to: identify a possible failure occurring on a power network based on activity statuses for multiple network devices in communications with a communications network and adapted to receive at least primary power from the power network; determine location information for at least a portion of the network devices; analyze the location information with a grid topology for the power network; and identify one or more potential failure locations on the power network based on the analysis.

According to yet another embodiment, a method for locating a possible power network failure on a power network is provided. The method may include: determining that a possible power network failure exists based on a first group of network devices without battery back-up capabilities having an inactive status on a communications network and a second groups of network devices with battery back-up capabilities having an active status on the communications network, wherein each of the first and the second groups of network devices are adapted for receiving at least primary power from a power network. The method may further include: determining addresses for at least a portion of the first or the second groups of network devices; locating the addresses on a power network grid topology for the power network; and identifying at least one power network component or power network segment as a possible power network failure location based on locations of the at least a portion of the first or the second groups of network devices.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein:

FIGS. 8A-8C are example network health topology diagrams and data charts, according to example embodiments.

FIGS. 10A-10B are example user interfaces depicting network health, according to example embodiments.

DETAILED DESCRIPTION

Figure 1:
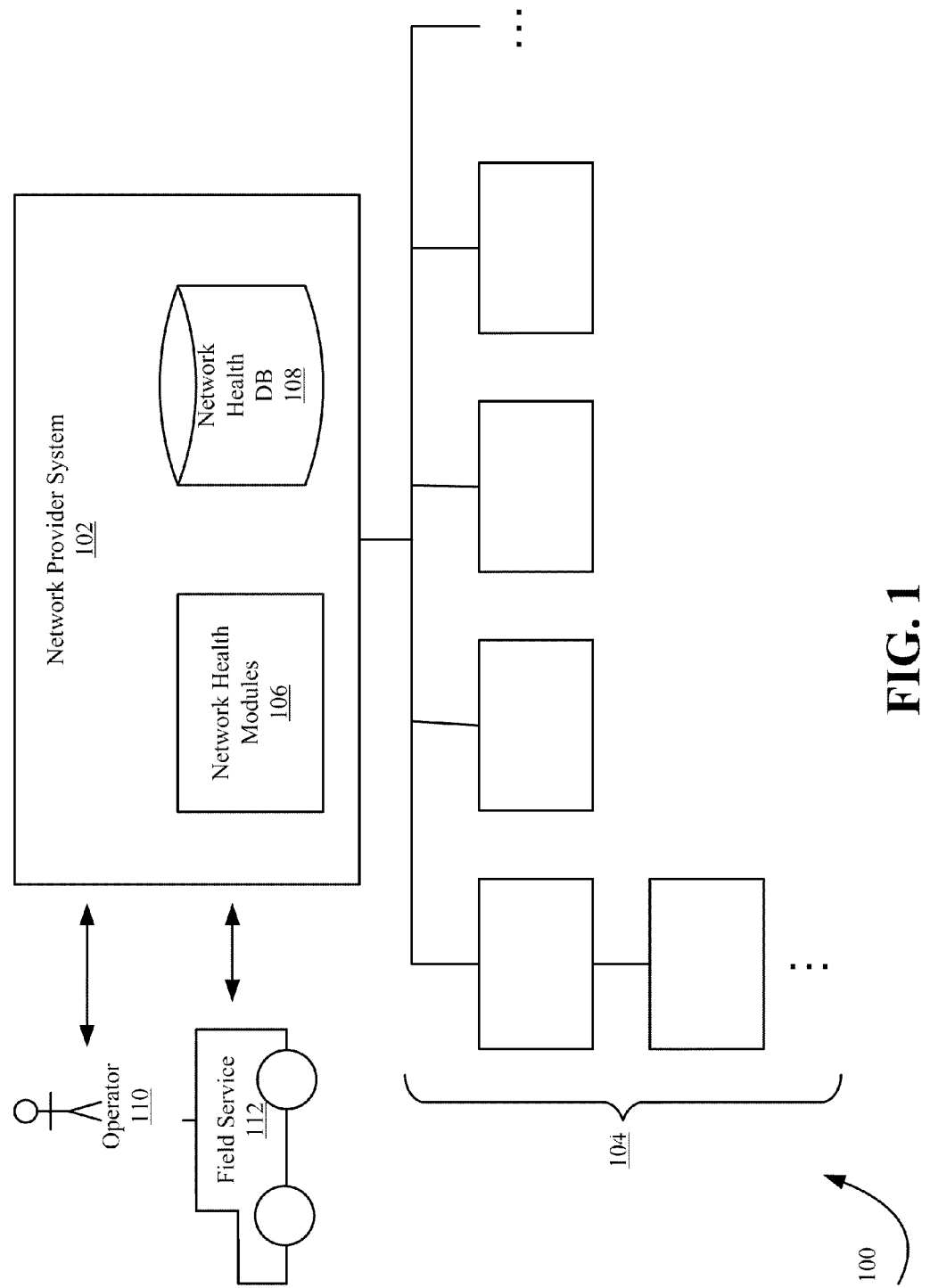
FIG. 1 illustrates an example system, according to an example embodiment.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Some embodiments of the invention include systems and methods for analyzing the health of communications networks and identifying segments within networks that are potentially causing interrupted or degraded network service. These systems and methods may be applied to any type of network, including, but not limited to, cable networks, telephony networks, data networks, and/or any other content or communications networks or any combination thereof (which are generally referred to as "networks" or "communications networks" herein). As discussed, the increasing customer demand and reliance on network systems create a need for improved network monitoring and response systems.

Conventionally, many components of a network are not "intelligent" or cannot provide detailed information regarding device statuses to a network provider system. Typically, network service issues are identified when one or more customers call complaining of the service. In some instances, an outage or other service issue is not finally determined as existing until a certain number of customers within a certain area have reported interruptions. Thus, the only data known at that time is where the customers are generally located and how many have complained of service issues. Under this approach, field service technicians typically go to the area reporting outages, which can typically be between 500 to 1,000 customers in a few-mile radius, to manually attempt to identify the location of the network fault by testing individual components of the network.

The disclosed systems and methods for analyzing network health described herein, however, obtain status information for each of the many network devices connected to a communications network, and analyze the status information for each of the network devices (or at least a subset thereof) by comparing individual network device statuses relative to statuses upstream and/or downstream of various network points. Understanding the statuses and/or performances of various network devices compared to the statuses of proximate network devices (e.g., devices that are in direct communication with a certain network device or downstream or upstream from a network device, etc.) aids in identifying an exact network segment as potentially being a cause for network failure or degradation. Network segments that are identified as potentially being faulty or calling for additional investigation according to the various analysis techniques described herein are generally referred to as a "Point of Interest" or "POI." A number of algorithms or other analysis techniques are utilized to "walk the network" and to identify POIs based on the statuses of proximate network devices. A logical topology of the network devices can be built, which represents device relationships and statuses at a given time to more efficiently, accurately, and quickly respond to network service issues. Data from a number of available systems can be utilized to build a logical representation of the network topology. The collected data and the network topology may also represent network device statuses, and performance levels, as well as information identifying exact addresses, details of customer premise equipment ("CPE"), and the like, to allow identifying and precisely locating actual outages, as well as identifying trends that may indicate anticipated outages before customers report service problems. Technicians with the right tools and skills can then be deployed to the exact outage location in a highly responsive manner. The network health analysis can be regularly repeated to provide frequent network monitoring and rapid identification of potential network service issues. These systems and methods thus provide faster time to resolution, fewer unnecessary truck rolls, and increased customer satisfaction.

In addition to periodically analyzing the network health and periodically generating a network status or health topology, embodiments may also provide for automatic generation and/or update of service tickets (or other service-related actions) and deployment of technicians responsive to the POIs identified by analyzing the relative status along the network topology. Thus, generating network service events, as well as the logging thereof, and deploying responsive service technicians can all be performed without any, or with very little, human interaction. Moreover, by correlating network status topology and customer information, embodiments can determine the number and type of customers impacted by a network service issue and assign service tickets a priority based on the combined network status and customer data according to predefined business rules. For example, priorities can be assigned based on the type of device malfunction, the number of impacted addresses or other network devices, service level agreements, the type of customer, the number or type of Revenue Generating Units ("RGUs"), and the like. Service priorities, such as, but not limited to, those mentioned can be associated with the service tickets or otherwise included in the service response protocol.

Moreover, according to some embodiments, the data gathered during the network status and health analysis can be stored in memory as a unique historical snapshot of the system at a given time. Maintaining network status and health information, including network health topologies, provides improved network service management. For example, operations personnel can utilize one or more user interfaces to research specific details about an outage or other service event (e.g., a POI), such as by viewing details of the network devices impacted or viewing potentially related nearby service issues, which may allow detecting larger or system-wide service interruption patterns. In addition, by storing historical snapshots in memory, historical conditions and/or performance of any device in the network topology can be assessed to identify any trends and allow predicting anticipated outages or degradations, such as, but not limited to, service event date and time, duration and clear times of other recent events, whether recent outages were sporadic, intermittent, or regular, or trends in device performance issues. Historical data can also be analyzed manually and/or automatically (e.g., machine learning, statistics, mathematical analysis, artificial neural networks, decision tree learning, clustering, etc.) to identify trends that statistically indicate a likelihood of service interruption and/or performance degradation, and in response set business rules based on these trends to identify potential POIs and/or create service tickets during future network health analysis.

In addition, some or all of the data can be gathered and presented via one or more user interfaces. One example user interface may include a network status topology indicating the status and/or health of network devices on the topology, which may optionally be combined with (e.g., overlaid on) a geographical representation of the network. This combined topology and geographical map can be utilized by service technicians to efficiently and effectively respond to potential service events, as well as for operations personnel to better identify potential network issues. Another example user interface includes a dashboard or other operations-based interface that presents network status and health data, optionally at many different levels of detail and abstraction.

In some instances, service issues may initially appear to be a communications network outage or other communications network-related event, but actually result from a power network failure that is external from the communications network and, thus, uncontrollable by the network provider system. The network provider system, however, is advantageously positioned to analyze different types and statuses of network devices to determine whether a service issue results from a power network outage instead of a communications network outage. Most network devices that are on a communications network receive primary power from an external power network, such as a commercial power supply company. Certain types of communications network devices are capable of being powered by a battery back-up. Importantly, the devices' statuses (e.g., active/inactive or on/off, etc.) can be determined over a communications network, whether they are powered by the power network or the battery back-up, because the network provider system is aware of the installed devices and can assign statuses depending upon whether it can receive signals from the devices, whether it can deliver signals to the devices, and/or the content of data is transmitted from the devices. Being able to determine whether a device is communicating as active or whether it is receiving its power from battery back-up will allow a network provider system to classify as a power network outage instead of a communications network outage and respond accordingly.

For example, according to one embodiment, if one or more network devices that are only capable of being powered by a power network are reported as being offline but at least one proximate network device that is capable of being powered by a battery back-up is indicated as online (and powered by the battery back-up), the network provider system can conclude that the service issues likely result from a power network failure instead of a communications network failure. In other embodiments, additional logic may be included to classify possible power network failures, such as to analyze a number of network devices and their respective statuses, their locations on the communications network, and their locations on the power network grid topology. Techniques similar to those utilized to identify a communications network POI may be applied to classify failures a power network failure.

In addition, after classifying a possible power network failure, the location on the power network grid topology of one or more power network components possibly causing the failure may be identified. The communications network provider system can associate network devices with customer addresses. Comparing the addresses of the network devices that appear to be suffering from a power network failure to a power network grid topology allows identifying power network components or network segments that may be responsible for the power network outage. Accordingly, because a communications network provider already has an installed base of devices that receive their primary power from a power network and are capable of reporting device status independent of the power network, a communications network is well-positioned to assess power network failures based on device status information received over its communications network. Whereas power companies are incurring massive expenses installing additional hardware to identify network statuses that may not otherwise be required (e.g., smart meters and smart home monitoring devices), a communications network provider may instead utilize its existing hardware to identify power network outages by more intelligently analyzing the device statuses and hardware types.

More details regarding the various means for implementing the embodiments of the invention are provided below with reference to FIGS. 1-18.

Identifying Points of Interest in a Communications Network

An example system 100 will now be described illustratively with respect to FIG. 1. The system 100 may include one or more network providers and associated network provider systems 102 operable to transmit or otherwise provide network-based services over one or more networks 104. A network provider system 102 may include, but is not limited to, a master transmission facility, or head-end facility, operable to receive and distribute content over the network 104, and/or operable to provide network-based services. Example network-based services that may be provided on or by the network 104 include, but are not limited to, cable television broadcasting services (or other linear programming), video on-demand services (or other non-linear programming), Internet access, email services, advertising services, telephony services, and the like. The network provider system 102 may include, or otherwise be referred to as, a network health analysis system. As used herein, the terms "network provider system" and "network health analysis system" are used interchangeably to generally refer to a system operable to analyze communications network conditions according to the embodiments described herein. It is appreciated that the term network provider system is not limited to a network system operator or multiple system operator, but may include any system operable to implement the embodiments described herein.

The network 104 may be any type of communications network, such as, but not limited to, a hybrid fiber coax network ("HFC"), a fiber optic network, a coax network, a wireless network, or any combination thereof. As used herein, the term "communications network" and "network" are used interchangeably to generally refer to a communications network. Other types of networks, such as an electrical power network as discussed in more detail herein, are expressly referenced. The network 104 shown in FIG. 1 represents a simplified version of a network having one or more network devices thereon. Network devices may include, but are not limited to, fiber optic nodes, amplifiers, splitters, couplers, taps, other nodes, and/or any number of CPE devices, which may include, but are not limited to, cable set-top boxes, cable modems, telephony modems, gateway devices, computer devices, and the like, and which may or may not be Data Over Cable Service Interface Specification ("DOCSIS") based devices. Any one of these network device types may represent a node in the network 104 and/or an endpoint in the network 104. Moreover, according to various embodiments, any network device may be analyzed as to the status of the device, the status of various network devices serving as endpoints in direct communication with the network device, which are referred to as "local" network devices, and/or the status of various network devices serving as endpoints that are in communication indirectly via one or more other network devices and located downstream on the network 104, which are herein referred to as "non-local" network devices. More details of example network 104 configuration and terminology are provided with reference to FIGS. 3A-3B below.

Generally, the network provider system 102 may be associated with one or more suitable processor-driven devices that facilitate the analysis of network status and health, as well as facilitating network communications and/or provision of content. Example processor-driven devices may include, but are not limited to, a server computer, a mainframe computer, one or more networked computers, a desktop computer, a personal computer, an application-specific circuit, a microcontroller, a minicomputer, or any other processor-based device. The execution of suitable computer-implemented instructions by the network provider system 102 may form a special purpose computer or other particular machine that is operable to facilitate the analysis of network status and health. Although a single network provider system 102 is described herein, the operations and/or control of the network provider system 102 may be distributed among any number of computers and/or processing components. Moreover, in some instances, the operations described herein may be performed by multiple network provider systems 102, such as if different network providers are involved in providing, monitoring, and/or analyzing network-based services.

Figure 11:
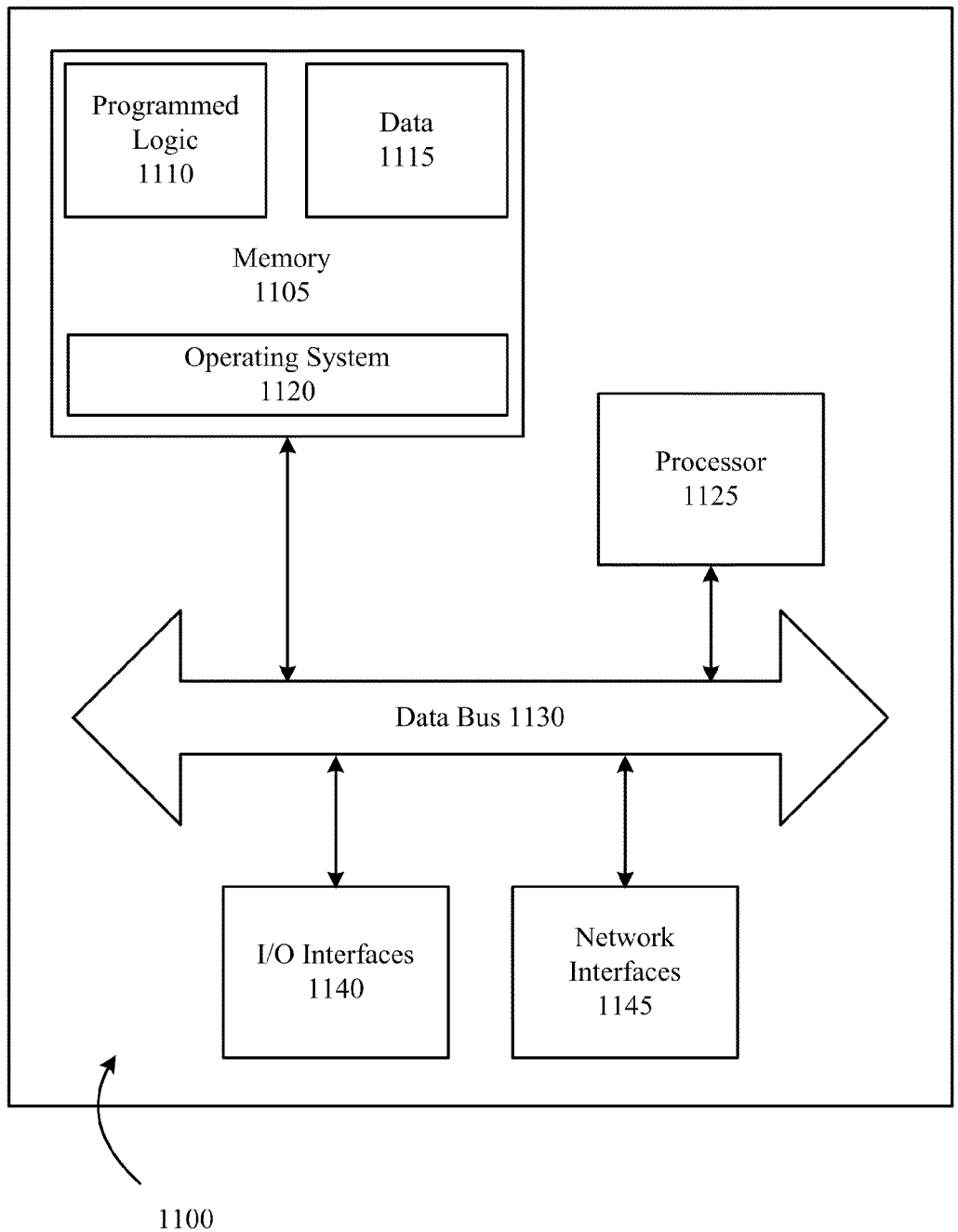
FIG. 11 is a block diagram of an example computer, according to an example embodiment.

Details of the network provider system 102 are described with reference to FIG. 11, illustrating a block diagram of an example computer system 1100. A computer or computers 1100 associated with the network provider system 102 thus include one or more processors 1125, one or more memory devices 1105, one or more input/output ("I/O") interface(s) 1140, and one or more network interface(s) 1145, all communicating over a data communications bus 1130. The memory device 1105 may be any suitable memory device, for example, caches, read-only memory devices, random access memory devices, magnetic storage devices, removable storage devices, etc. Additionally, any number of logical data storage constructs may be stored as desired within the memory device 1105, which may be any number of suitable databases, such as the network health database 108 illustrated in FIG. 1. The memory device 1105 may further store a wide variety of data 1115, such as may be useful to implement the operations described herein. Additionally, the memory device 1105 may store executable programmed logic instructions 1110 (also referred to herein as "programming logic") and/or various program modules utilized by the network provider system 102, for example, an operating system 1120, a network health module, customer information modules, network topology modules, network device status and/or health modules, service and customer support modules, business rules, performance metric modules, and/or visualization and display modules, such as are described in more detail herein. The operating system 1120 may be a suitable software module that controls the general operation of the network provider system 102, and may also facilitate the execution of other programmed logic instructions 1110 by the one or more processors 1125, for example, the network health module. The operating system 1120 may be, but is not limited to, Microsoft Windows®, Apple OSX™, Linux, Unix, or a mainframe operating system. The programmed logic 1110 may be, but is not limited to, iterative programming and/or functional programming constructs.

With continued reference to the example computer system 1100, the one or more I/O interfaces 1140 may facilitate communication between the network provider system 102 and one or more input/output devices, for example, one or more user interface devices, such as, a display, keypad, mouse, pointing device, control panel, touch screen display, remote control, microphone, speaker, etc., which facilitate user interaction with the network provider system 102. The one or more network interfaces 1145 may facilitate connection of the network provider system 102 to one or more suitable networks, for example, the network(s) 104 illustrated in FIG. 1, and/or any other networks, such as, but not limited to, the Internet, wireless networks, local area networks, wide area networks, private networks, direct communication links, and the like. In this regard, the network provider system 102 may receive and/or communicate information to other components of the system 100, such as any of the network devices on the network 104 and/or any other computing devices, such as may be utilized by an operator 110 and/or a field service technician and/or a vehicle 112, other network provider systems 102, and/or other components conventionally associated with content and/or communications networks. Data communicated to or from the network provider system 102, as described in more detail herein, may include real-time, near real-time, and/or batch communications, and may be synchronous, asynchronous, or any combination thereof.

With reference again to FIG. 1, one or more operators 110 may be associated with or otherwise interact with the network provider system 102. Operators may utilize the network provider system 102, such as to monitor and maintain the status of the network 104, to configure network operations, to respond to network service events, and the like. In one embodiment, the network health modules 106 provide for one or more user interfaces (e.g., a dashboard) that display the network 104 status and/or health, and assist in identifying and/or responding to POIs. In addition, one or more field service technicians and/or vehicles 112 may interact with the network provider system 102, such as to receive service tickets, combined network topology and geographical maps, and associated network status information (e.g., over a wireless network, such as a cellular network, a wide area network, a wi-fi network, etc.). It is appreciated that any number of means may be utilized to communicate and/or provide network status information to the operators 110 and/or the field service technicians/vehicles 112.

Figure 2:
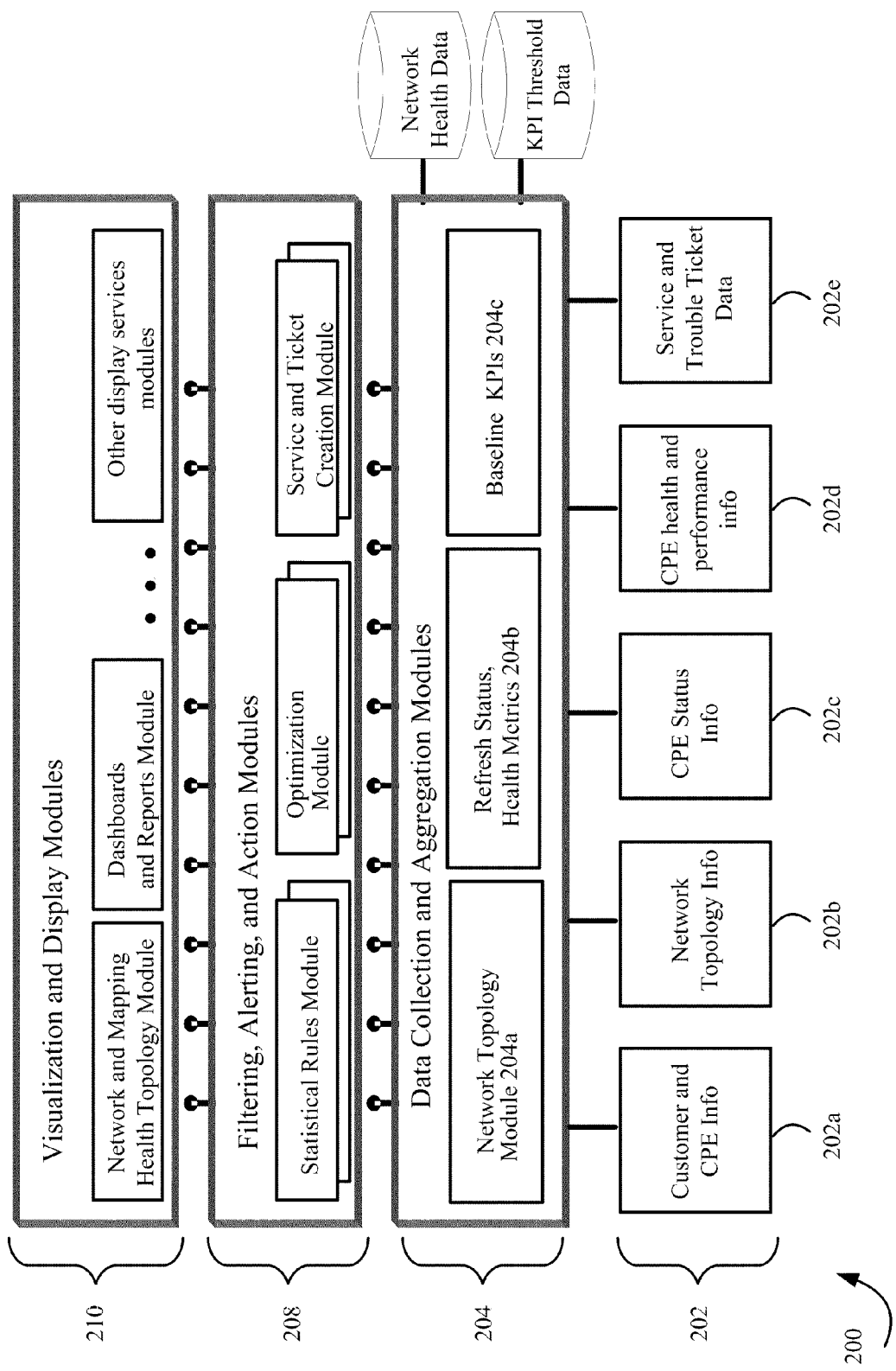
FIG. 2 illustrates a block diagram of example network analysis modules, according to an example embodiment.

FIG. 2 illustrates a block diagram 200 of the various programming modules and data sources that may be provided by a network provider system 102, such as via the one or more network health modules 106 illustrated in FIG. 1. At the bottom level of the logical diagram 200 are example information and data sources 202, which can be utilized to analyze the health of a network. Example information and data sources include, but are not limited to, customer and CPE information 202a, network topology information 202b, CPE and other network device status information 202c, CPE and other network device health and performance information 202d, and/or service ticket and other response information 202e. Customer and CPE information 202a may be provided from one or more systems, such as a system of record for maintaining customer information and associated network devices and/or services owned and/or subscribed to by the customers. This data may be refreshed periodically (e.g., within minutes, hourly, 12 hours, 24 hours, etc.) such that the information gathered by the network provider system 102 is relatively up-to-date. The network topology information 202b may be provided from one or more systems, such as a system of record for maintaining general network topology data (e.g., device type, location, and relationship of network devices on the network 104), which may also be updated periodically. The CPE and other network device status information 202c may be provided from one or more systems, such as a system of record for network device status data (e.g., on/off status, active/inactive, etc.), and/or from one or more systems operable for polling or otherwise retrieving signals from CPE devices (and/or other network devices). The CPE and other network device health and performance information 202d may be provided from one or more systems, such as a system of record for network device health and performance data operable to obtain or otherwise identify relative levels of network device health and/or performance. Example network health and/or performance metrics include, but are not limited to, transmit/receive signal strength, modulation error ratio (e.g., upstream and/or downstream metrics, etc.), voice port loss of contact events, communications line or link errors, changes in one or more metrics over time, and the like. The service ticket and other response information 202e may be provided from one or more systems, such as a service center or other customer or network service system operable for generating, tracking, responding to, reporting, and storing information associated with service tickets and other network service activities. This information may be useful to analyze whether a service ticket has already been generated for an identified POI, whether the status or other relevant information has changed, or whether the service event has been corrected. It is appreciated that the aforementioned information and data sources are provided for illustrative purposes and are not intended to limit the type and/or content of the data sources that may be utilized according to various embodiments.

Next shown are the various data collection and aggregation modules 204 that may be utilized by the network provider system 102 to collect and process the information from the information and data sources 202 for use in analyzing the health of the network 104. For example, a network topology module 204a may utilize the information collected from the network topology information source 202b to build a logical representation of the network topology. In addition, the network topology module 204a may analyze the CPE status information 202c and/or the CPE health and performance information to assign network device statuses and/or performance conditions to the network devices and/or other network components represented by the network topology. As described in more detail herein, the network topology module 204a may be utilized, at least in part, to identify one or more POIs based on the statuses and/or health data of proximate network devices, such as by comparing the statuses of downstream network devices to the statuses of upstream network devices. In addition, according to one embodiment, a refresh status and health metrics module 204b and/or a baseline and key performance indicator module 204c may be provided. The refresh status and health metrics module 204b may generally be operable to configure refresh rates and metrics measured, collected, and/or analyzed. Similarly, the key performance indicator module 204c may generally be operable to configure metrics and thresholds to be monitored, such as, but not limited to, when analyzing network device health and performance levels against one or more predefined thresholds, calculating a percentage of equipment over or under one or more performance thresholds, one or more devices or groups of devices that change in performance over time, and the like. It is appreciated that any of these data collection and aggregation modules 204 may be operable for user configuration or customization, such as making offline or online adjustments. It is further appreciated that the aforementioned data collection and aggregation functions are provided for illustrative purposes and are not intended to limit the type and/or function of the analyses provided, according to various embodiments.

Also shown are two databases or other memory devices 206 that are operable to store data utilized and/or generated by the data collection and aggregation modules 204. For example, according to one embodiment, a network health database 206a may be provided for storage and retrieval of network health snapshots, such as network health topologies generated at certain points in time and/or other network health data collected. The network health database 206a may further include the raw network device status and health data as provided by one or more of the information and data sources 202, which may be extracted at any point in time to generate an updated network health topology. As another example, a key performance indicator/threshold database 206b may be provided for storage and retrieval of metrics and thresholds, both active and/or historical levels, such as may be utilized by the refresh status and health metrics module 204b described above. It is appreciated that the aforementioned database examples are provided for illustrative purposes and are not intended to limit the type and/or content of data stored by these systems according to various embodiments.

The next level represented by FIG. 2 includes filtering, alerting, and other action modules 208. These modules may generally be operable for providing additional user and/or business customization and configuration, such as to implement service level business rules and service response prioritization, which may be provided by the statistical rules module 208a and/or the optimization module 208b. In addition, a service and ticket creation module 208c may be operable to facilitate the generation of service tickets associated with network service events and corresponding POIs identified. As described in more detail herein, according to various embodiments, the service and ticket creation module 208c may allow for automatic generation and distribution of service tickets, including the association of network status and/or health information. According to one embodiment, the service and ticket creation module 208c is operable to automatically analyze updated network health topologies as they are created according to various service business rules, and, when POIs are indicated and/or when other conditions are violated, to generate new service tickets or update existing service tickets based on the updated network health topology.

Finally, at the top level of the logical representation 200 are the visualization and display modules 210, which may generally be operable to provide one or more user interfaces or other representations of the network's health. According to one embodiment, a network health and mapping module 210a may be included that is operable for combining the network status and topology data with other network and/or geographical maps or other representations to simplify servicing and responding to service events. As one example, which is explained in more detail herein, a network health topology may be overlaid or otherwise combined with a geographical map of the same or similar geography, which may be beneficial to operations personnel and/or field service technicians. In another example, a dashboard and report module 210b may be provided to generate a dashboard interface and/or reporting interface or output to logically depict detailed information regarding the status and health of a network. It is appreciated that the aforementioned user interfaces and display means are provided for illustrative purposes and are not intended to limit the type and/or function of visualization and display functions provided according to various embodiments.

Figure 3A:
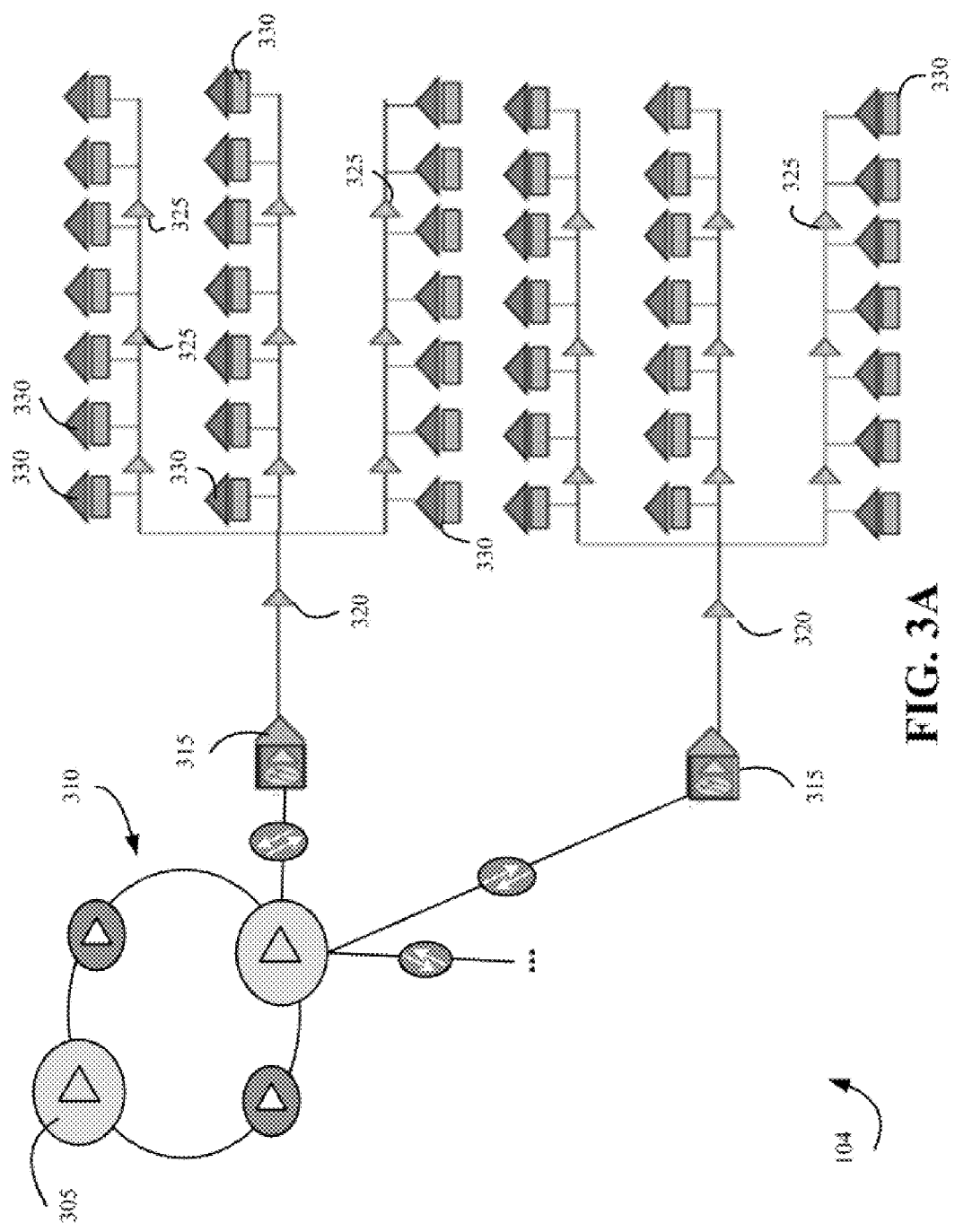
FIGS. 3A-3B are example network topology diagrams, according to example embodiments.

FIG. 3A illustrates an example network topology of a network 104 according to one embodiment, which is simplified for illustrative purposes. According to one embodiment, a network topology may include a head-end or other transmission facility 305 (e.g., the network provider system 102), a distribution hub 310, one or more optical nodes 315, one or more trunk amplifiers 320, one or more line amplifiers 325, and one or more endpoints 330, which may include a single CPE or other network device, or may be a grouped representation of all CPE or network devices associated with a single address or service (e.g., residence or business serviced by the network provider system via the network 104). The network 104 itself may be an HFC network, a fiber optic network, a coax network, or any combination thereof, according to various embodiments. Although this network topology is illustrated with specific network components, as utilized herein, the term "network device" may interchangeably refer to any one of the aforementioned network components (or other network components). Similarly, the term "node" may generally refer to any connection point in the network that has one or more network devices directly in communication therewith and/or with one or more network devices in indirect communication downstream or upstream on the network. It is appreciated that the term "node" as used herein may itself be a network device, such as a tap, splitter, amplifier, optical node, etc.

Figure 3B:
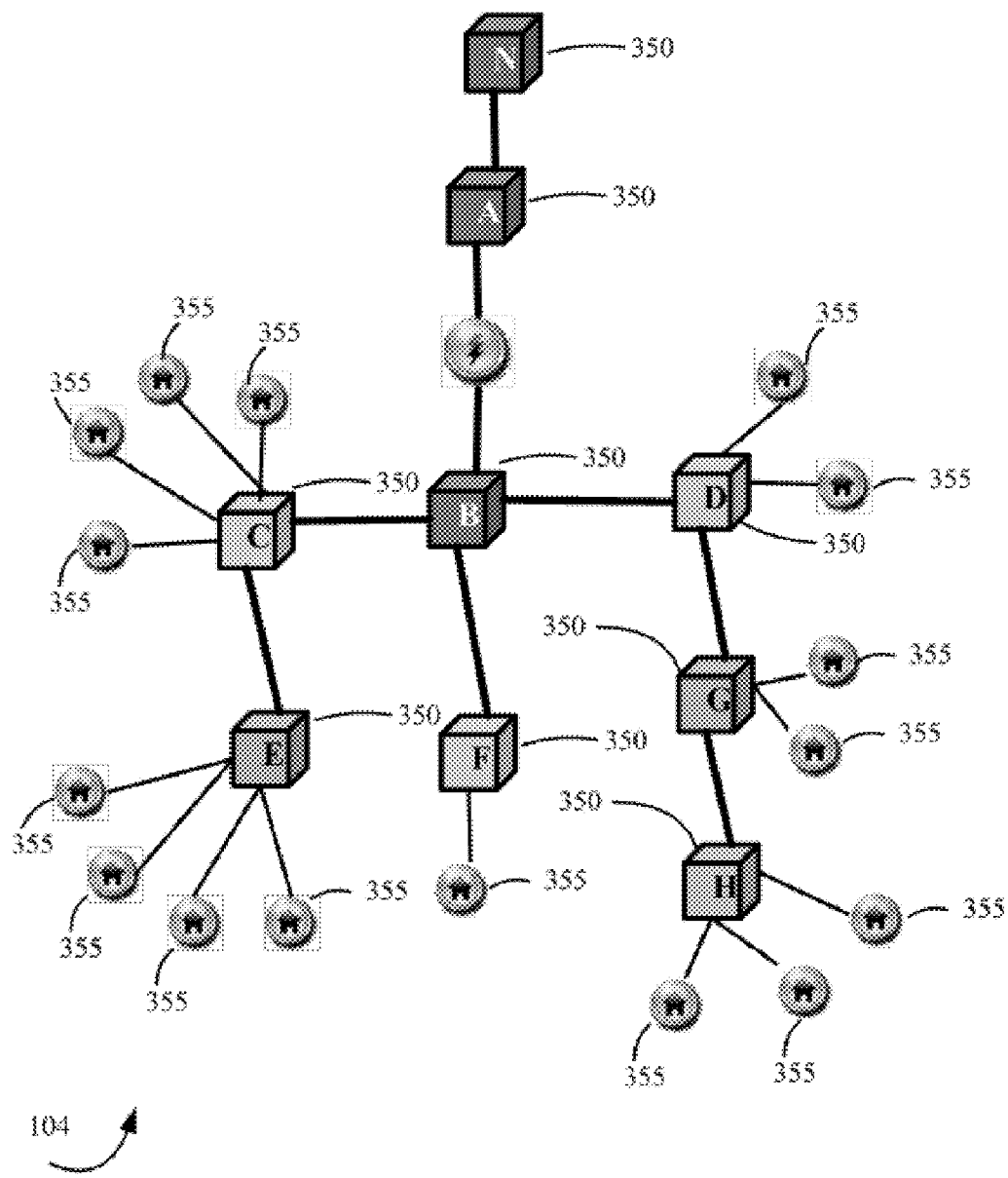

FIG. 3B illustrates a different network topology representation of a network 104. According to this representation, the network 104 may include a number of nodes 350 and one or more endpoints 355. A node 350 may be any connection point in the network that has one or more network devices directly in communication therewith and/or one or more network devices in indirect communication downstream or upstream on the network. An endpoint 355 may represent a single network device (e.g., a CPE) or a group of network devices associated with a single address or service. A network topology such as this allows easily identifying the parent-child relationships between proximate nodes 350 and between nodes 350 and local and non-local endpoints 355. For example, as shown here, beginning from the most peripheral node or nodes (e.g., those that do not have any non-local network devices associated therewith), which are the nodes 350 labeled "E," "F," and "H": node "E" 350 has four local endpoints 355 associated therewith, node "F" 350 has one local endpoint 355, and node "H" has three local endpoints 355 associated therewith. Following the network 104 up from the most peripheral nodes, tracing the network branch ending with node "E" 350, node "C" has four local endpoints 355 associated therewith and four non-local endpoints 355 downstream, which are the four endpoints 355 that are local node "E" 350. Accordingly, a parent-child relationship is created between nodes "C" and "E" 350, with the parent node 350 having local endpoints 355 and non-local endpoints 355 associated therewith. Continuing upstream, node "B" 350 has no local endpoints 355, but will have each of the local endpoints associated with nodes "E," "C," "F," "H," "G," and "D" as non-local endpoints.

Figure 5:
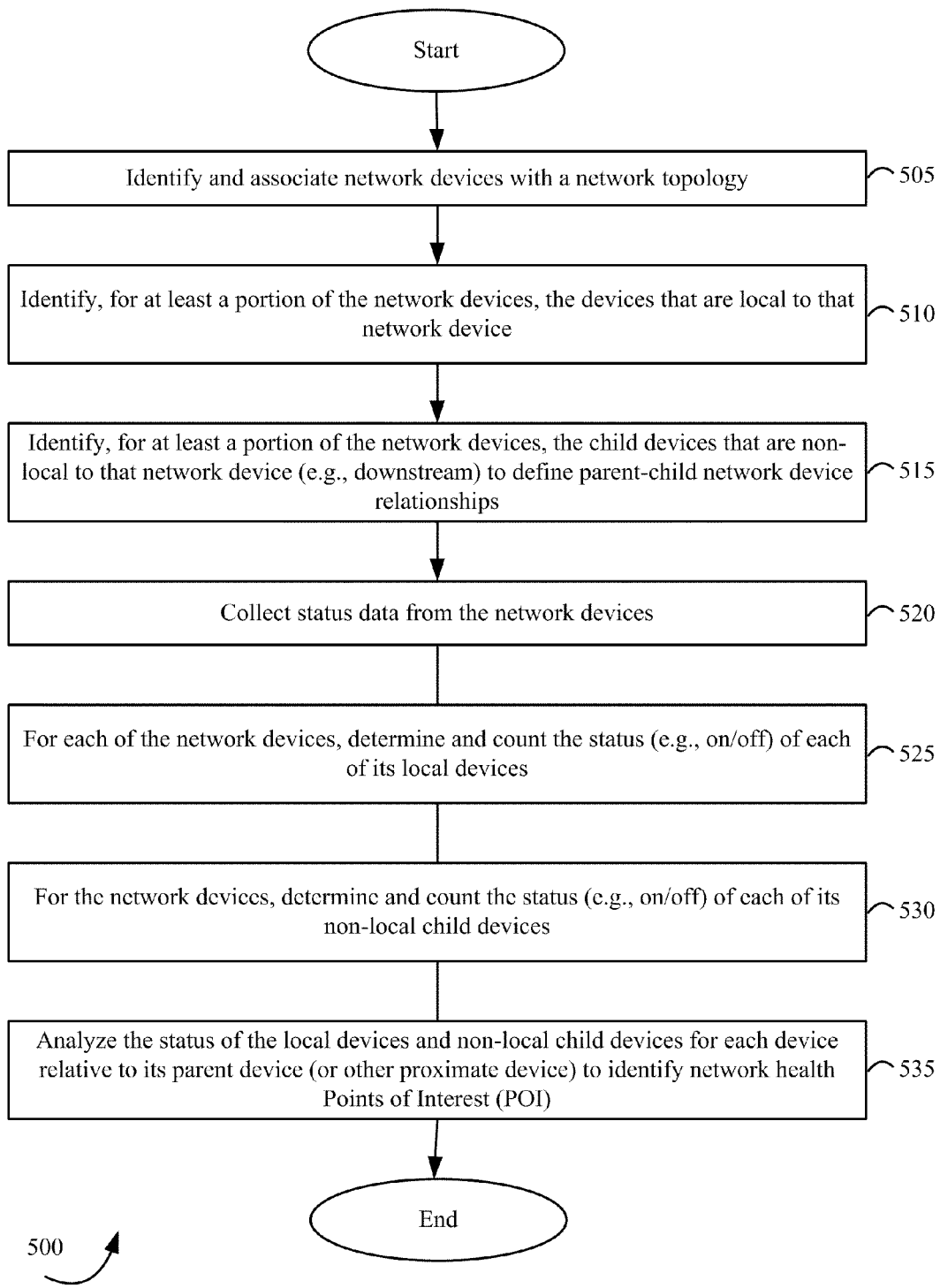
FIG. 5 is a flow diagram of an example method for analyzing network health correlating network device statuses with a network topology, according to an example embodiment.

As further described herein, knowing the number of network devices directly associated with each network device as well as the number of network devices downstream that are indirectly associated will be beneficial in identifying any POIs on the network 104. For example, as described below with reference to FIG. 5, comparing the network device statuses of all local and non-local network devices at one node relative to the network device statuses for all local and/or all non-local network devices at the parent node (e.g., immediately upstream on the network 104), a determination can be made as to which point or where in the network 104 is faulty or otherwise causing an outage and/or performance degradation. As one example, comparing the on and off statuses of network devices, if all local and non-local downstream network devices at one node are reporting as off or inactive, but at least one local network device associated with the immediate parent node (e.g., immediately upstream) is reporting as on or active, then the portion of the network 104 between the parent node and the immediate child node (and including either of the node network devices) may be considered the POI, representing the portion of the network 104 where the network activity status changes from inactive to active.

The representation illustrated in FIG. 3B allows considering the performance of the network 104 performance using a tree and leaves metaphor, whereby the backbone of the network itself comprises a tree trunk and its branches and the endpoints comprise the leaves on a tree. Thus, walking up the network is similar to finding the dead or dying leaves on a tree and walking up the tree branch until one or more live leaves are found. It may thus be assumed that damage or disease is impacting the tree at a point between the live leaves and the dead or dying leaves. Similarly, on a network 104, the point between active network devices and inactive devices becomes a POI where it is likely the network 104 is experiencing failure at or near or otherwise associated with that portion of the network 104.

As further described herein, a POI may be identified according to a number of different algorithms and comparisons, including, but not limited to, the number of active or inactive network devices at proximate portions of the network 104, the number of network devices operating above or below one or more predefined thresholds, changes in performance trends, and the like.

Figure 4:
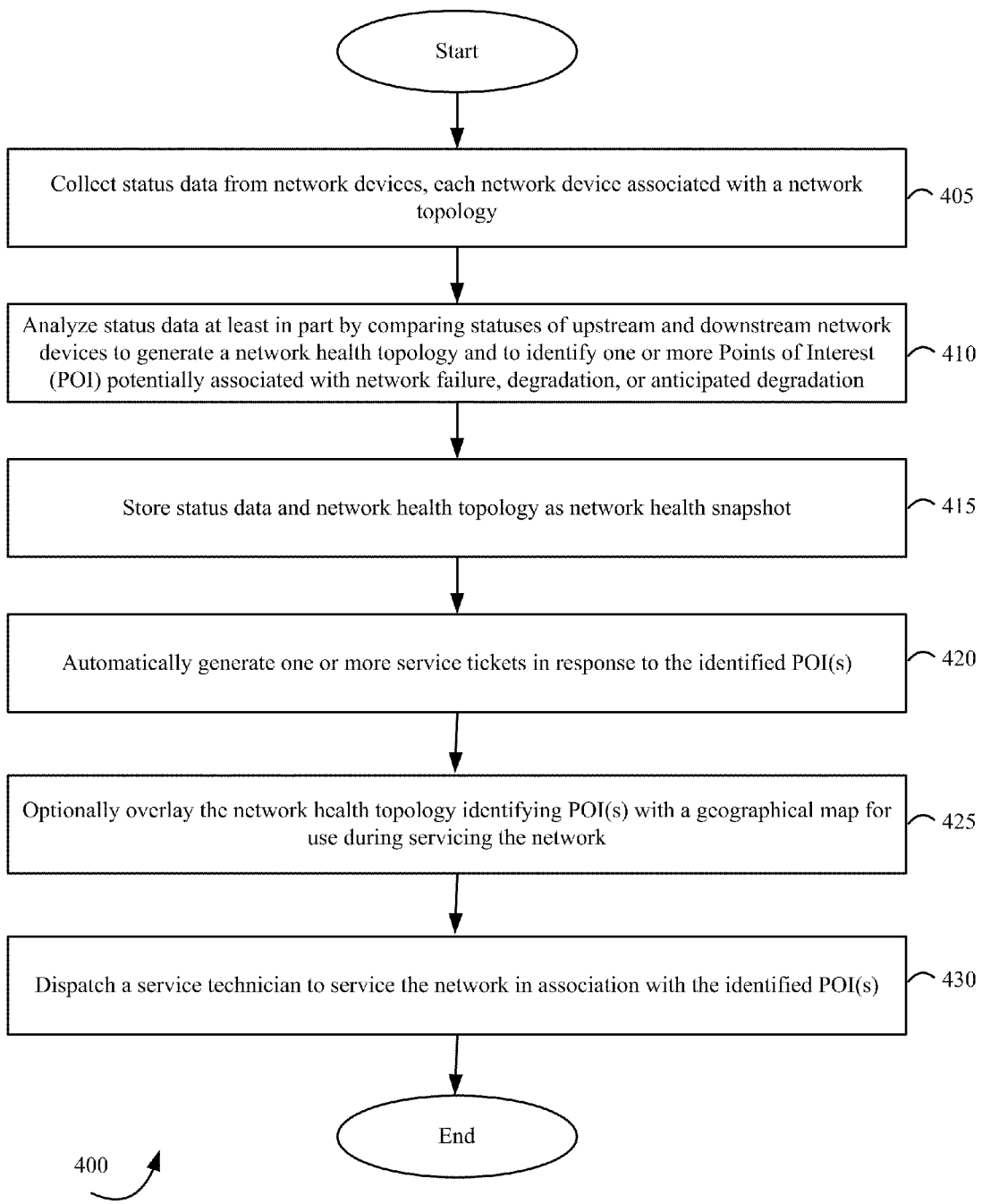
FIG. 4 is a flow diagram of an example method for analyzing network health, according to an example embodiment.

FIG. 4 illustrates a flow diagram of an example method 400 for analyzing the status and/or health of a network, according to one embodiment, such as may be performed at least in part by the network health modules of the network provider system 102 described with reference to FIGS. 1-2.

The method 400 may begin at block 405, in which the status and/or health of each device on a network is collected. As discussed with reference to FIGS. 3A-3B, the network may include one or more nodes (or network devices), each of which may have one or more local network devices associated therewith and/or one or more non-local network devices associated therewith. Local network devices are those network devices in direct communication, such as the endpoints in direct communication with a node described with reference to FIG. 3B. Non-local downstream network devices are those network devices that are located downstream from the node on the network, but not in direct communication, such as local network devices to a child node. The status of each network device may include, but is not limited to, active/inactive status, on/off status, a relative performance level, status and/or health trends relative to past performance, and the like. The network device statuses can be gathered from any number of information and data sources, such as the information and data sources 202 described with reference to FIG. 2.

In one example embodiment, the network device status is gathered from each endpoint device. The endpoint devices may represent each individual network device at each address, or may be represented cumulatively as a single status at the address. Given that different network devices may be operable to convey different statuses and/or different levels of status and/or performance information, the network provider system may be configured to make relative determinations and "normalize" the device statuses gathered from different network device types. Examples of status and/or health information may be, but are not limited to, transmission information, receiving information, modulation error ratios ("MER"), and the like. According to various embodiments, this information may be received from, but is not limited to, cable modems, set-top boxes, telephony modems, power supplies, or any other self-diagnostic network or CPE device. For example, cable modems, set-top boxes, and telephony modems may provide transmission, receiving, and/or MER information, while power supply devices may provide poll data and on/off statuses.

Accordingly, following block 405 is block 410, in which the statuses of at least a portion of the network devices are analyzed to identify one or more POIs that may need servicing or otherwise represent network performance issues. According to one embodiment, the statuses of network devices are compared to other proximately located network devices. For example, in one embodiment, network device statuses located downstream on the network are compared to network device statuses located upstream. Generally, a change in network device status occurring between two proximate points in the network may indicate a POI to be serviced or investigated further. At block 410, any number of statuses may be analyzed, according to various embodiments, such as, but not limited to, active/inactive status, on/off status, a relative performance level, status and/or health trends relative to past performance, and the like.

For example, according to one embodiment, correlating the on/off or active/inactive status of each device with its relative location within the network, and comparing on/off or active/inactive statuses between proximately located devices, can be utilized to analyze the health of the network and identify POIs based on status changes. Additional details of correlating on/off or active/inactive statuses with network locations (also referred to as "correlating") are provided with reference to FIGS. 5 and 8A-8C.

In another embodiment, the status information gathered may indicate relative network device performance levels (also referred to herein as network device "health"), which can be compared to one or more thresholds. By comparing relative performance levels to thresholds, POIs where network degradation may be occurring can be identified before outages (e.g., represented by on/off or active/inactive statuses) occur. According to various embodiments, comparing network device performance levels to thresholds may be done independent of network location, or may also be correlated with the network topology to more specifically identify POIs based on the impact of the network and proximate network devices. For example, multiple network devices within a confined geographical area that are performing at or below one or more predefined thresholds may indicate network service issues near or upstream of the geographical area, and the exact location may be identified at the point where performance levels meet or exceed the thresholds. In another embodiment, thresholds may be utilized to measure the absolute number (or percentage) of proximate network devices (e.g., local to a node, within a defined geographical area, in communication with a portion of the network, etc.) that are to be reported as inactive before a POI is generated. Additional details of comparing these devices to thresholds (also referred to as "thresholding") are provided with reference to FIG. 6.

In yet another embodiment, the status information gathered may be compared to historical status information previously gathered and stored in memory for the same network devices. Comparing current status information to historical status information allows identifying one or more trends that may indicate network service events. Moreover, identifying one or more network devices that are following previously determined service event trends allows preemptively servicing or otherwise addressing the potential network service issues. Similar to the thresholding previously described, identifying network device status and/or health trends may also be correlated with the network topology to more specifically identify POIs based on the changing trends of areas of the network and of proximate network devices. Additional details of analyzing network device status and/or health data (also referred to as "trending") are provided with reference to FIG. 7.

In one embodiment, as part of analyzing the status and/or health data, whether performing correlation, thresholding, or trending, the network provider system may be configured to generate one or more network health topologies that visually indicate the relationships between network devices as well as the status and/or health of one or more of the network devices. For example, as further described in more detail with reference to FIGS. 8A-8C, the same or similar network topology as described with reference to FIG. 3A or 3B may be generated that also indicates the status of each network device, such as each endpoint. Accordingly, any POIs may be easily identified and/or represented visually, as well as, or instead of, algorithmically.

The operations of blocks 405 and 410 may be repeated or refreshed at periodic intervals (e.g., thirty seconds, five minutes, fifteen minutes, hourly, etc.) to allow frequent monitoring and identifying of network service events. Moreover, the analysis may be performed on a "rolling" basis, such that the system need not wait until new status or health data is gathered from all network devices before a network health analysis is performed. Instead, the network health can be analyzed at any frequency, utilizing the latest gathered data for each network device, whether it has changed since the last analysis or not. Otherwise, the size of the network and number of network devices to be monitored may begin to limit the speed and/or frequency by which network health analysis can be performed.

Following block 410 is block 415, in which the network provider system is operable to store the status data, health data, and the network health topologies retrieved or generated at blocks 405-410 in one or more memories. Storing the status, health, and/or network health topology data provides network health snapshots representing the network at that given time. These historical network health snapshots can be utilized for comparison when analyzing network status trends or other changing network conditions. The snapshot data may also be utilized to generate reports useful in analyzing network performance, and/or to provide detailed information in a user interface dashboard.

Following block 415 is block 420, in which the network provider system is operable to generate one or more service tickets or other network service related actions responsive to identifying the one or more POIs at block 410. Because the operations of blocks 405-410 may be performed on a frequent basis, automatically generating service tickets allows rapidly deploying field service technicians and rectifying the network service issue, while also reducing the manpower required to analyze and identify the network status and health. According to various embodiments, service tickets may include any or all of the information gathered or otherwise generated at blocks 405-410. For example, a service ticket generated may include, but is not limited to, network device information (e.g., status, type, performance levels, outage time/date, etc.), address information, contact information, network location, network health topology, geographical map, combined network health topology and geographical map, expected or associated service levels, and the like.

Following block 420 is block 425, in which the network health topology representing the statuses of each of the network devices on the network is overlaid or otherwise combined or associated with a geographical map representing the same or similar area, according to one embodiment. Combining a network health topology with a geographical map allows a field service technician to more efficiently respond and rectify network service issues. For example, in some instances, the network cabling may be run to an address or split from a network tap in an unexpected manner, which could be indicated by the combined network health topology and geographical map. It is appreciated that this combined map may also include network device status, relative performance levels, other network components, other networks (e.g., power network, water, other utilities, etc.), any of which may be useful to the field service technician in responding to the network service event. Additional details regarding a combined network health topology and geographical map are provided with reference to FIG. 9.

At block 430 a field service technician can be dispatched in response to identifying one or more POIs at block 410. According to one embodiment, the field service technician may be dispatched automatically in response to creating the service ticket (or in response to any other dispatching event) to minimize the delay and manpower required to effectively service the network. Moreover, any or all of the aforementioned network status information may be provided to the service technician, such as via the service ticket, via a field service application (e.g., wirelessly, such as over a cellular network, wi-fi network, etc.), or according to any other means for distributing service and network status information to a field service technician.

According to one embodiment, as part of dispatching a field service technician, network health information may be displayed to one or more operator personnel via a user interface, such as a dashboard. A user interface may advantageously provide varied levels of detail about the network and its status and performance levels associated with individual nodes, network devices, and/or addresses. Example user interfaces are described in more detail with reference to FIGS. 10A-10B.

The method 400 may end after block 430, having collected and analyzed network device status and health information to determine the health of the network and to identify any POIs that may exist.

FIG. 5 illustrates a flow diagram of an example method 500 for analyzing the status of a network utilizing on/off or active/inactive statuses (e.g., correlation), according to one embodiment, such as may be performed at least in part by the network health modules of the network provider system 102 described with reference to FIGS. 1-2. According to this embodiment, the network is analyzed to identify network devices reported as off, and then to identify the next proximate network location that contains devices that are reported as on. Identifying the portion of the network where devices associated with one node are reported as off and devices associated with another node are reported as on can be used to indicate a POI on the network for repair and/or additional analysis.

The method 500 may begin at block 505, in which the network devices and network topology are defined. For example, as described in more detail with reference to FIG. 3B, the nodes on the network with local and/or non-local network devices are identified. Additionally, the relationships between nodes are identified to define parent-child or otherwise define nodes and/or network device dependencies. Associating the network devices (e.g., the endpoints) and nodes with a network topology, such as illustrated with reference to FIG. 3B, allows logically analyzing the network based at least in part on network device and/or node dependencies.

Following block 505 is block 510, in which, for each network device (or at least a portion of the network devices), the number of network devices that are local to that device are identified and counted. As described previously, local network devices are those network devices that are in direct communication with the network device in question without any interceding network device. For example, as described with reference to FIG. 3B, the local endpoints 355 are identified and counted for each of the nodes 350. It is appreciated that, in some embodiments, amplifiers, splitters, cabling, and/or other network components may be positioned between the network device and the node, though the device is still defined as local.

Following block 510 is block 515, in which the number of non-local downstream network devices are identified and counted for each network device. As described previously, non-local network devices are those network devices that are located downstream on the network and dependent upon the network device being analyzed, but not in direct communication therewith. Again, with reference to FIG. 3B, the non-local endpoints 355 that are downstream for each of the nodes 350 are identified and counted. Accordingly, after blocks 510 and 515, a network topology can be generated that identifies the parent-child relationships of network devices on the network, as well as the number of endpoints (or other network devices) either directly or indirectly dependent on each of the network devices (e.g., dependent from each node).

Following block 515 is block 520, in which the status of each device on a network is collected. The statuses may simply indicate whether the device is on/off, active/inactive, or online/offline (all referred to interchangeably herein). Accordingly, this type of status information may generally be utilized to identify outages, but not necessarily degradations in performance.

Following block 520 are blocks 525 and 530, in which the number of active and inactive statuses, respectively, for local network devices and the number of active and inactive statuses, respectively, for non-local network devices are counted for each network device. For example, according to one embodiment, the statuses of the endpoints that are local to each node and the statuses of endpoints that are non-local and downstream from each node are determined and counted. Thus, for each node, a count is provided for the number of active local network devices and the number of inactive local network devices, as well as a count for the number of active non-local downstream network devices and the number of inactive non-local network devices. Traversing the network upstream, each node typically includes an increasing number of non-local network devices because the number of network devices that are local to downstream nodes are included in the non-local count. This property of cumulatively including non-local network device statuses from downstream devices can be referred to as "rolling-up" or "roll-up" data, allowing, in some instances, an indication of network status downstream to be reflected in data (e.g., non-local data) associated with an upstream device. Additional details regarding node and network device dependencies and status counts are provided with reference to FIGS. 8A-8C.

Following block 530 is block 535, in which the statuses of the local and non-local network devices associated with one or more nodes (or other network devices) are analyzed to identify any POIs on the network. Any number of analysis techniques and algorithms can be utilized to identify a POI on the network.

For example, according to one embodiment, the number (or percentage) of active local network devices versus the number (or percentage) of inactive non-local network devices at a node can be compared to identify whether that node has service but dependent or downstream nodes and/or devices do not. For instance, beginning at the most peripheral node or nodes, when a node is identified that indicates all local network devices are inactive, the next node located upstream is reviewed to determine whether it has any local network devices that are active. If the next (or parent) node indicates that at least one network device is active, then it can be assumed that there are no service issues with the parent node and that the POI exists at or downstream from the parent node (e.g., between the parent and the child nodes, at the parent node, or at the child node). Otherwise, if the parent node also indicates all local network devices are inactive, then the next upstream node (that node's parent node) is similarly analyzed. This process can be continued upstream until a point in the network is identified where the level of local devices inactivity changes to being active, which is thus identified as a POI on the network calling for servicing and/or subsequent analysis.

According to various embodiments, different types of network POIs may be identified depending upon the relative status of proximate network devices. For example, two different types of POIs may include a network POI and a local POI. A network POI may indicate network service issues that are caused by network devices from which significant portions of the network depend. Service issues may include, but are not limited to, vandalism, installation errors, corrosion, signal ingress, signal egress, construction obstruction or damages, power outages, acts of nature, line breakage, and the like. When determining the cause of a network POI, trends are analyzed. Network POIs generally affect multiple segments (if not all segments) of the network downstream from the POI location on the network. A local POI may indicate network service issues that only affect a small segment of the network and do not necessarily impact downstream service issues. Generally, a local POI may be limited to impacting devices that are local to the faulty node or other network device.

According to one embodiment, a network POI may be defined as the segment in a network where all network devices downstream are reported as inactive and at least one network device upstream is active. The network POI is the primary example of POI detection described herein.

According to one embodiment, a local POI may be defined as a network device with all local network devices reporting as inactive and at least one non-local downstream network device reporting as active. Thus, because there is an active network device located downstream on the network, the service issue is local to that node and does not have greater downstream impact, such as a network POI would. In some embodiments, to counter the impact of a few customers who may have intentionally powered off a network device when no service issue exists, at least a certain number of local network devices must be associated with the node and be reported as inactive before the node is assessed as indicating a POI. Otherwise, a POI may be falsely identified for a node that only has one associated local network device that is powered off but not experiencing service issues. This threshold number may differ according to the network design, service goals, geography, etc. It is further appreciated that similar algorithms may be provided to identify network POIs, and local POIs may be based on the thresholding or correlation analyses described with reference to FIGS. 6-7.

Therefore, these systems and methods allow specifically identifying large-scale network POIs as well as smaller concentrated POIs in an efficient and effective manner. Previously, smaller, concentrated network failures that did not impact large portions of a network were difficult to target with accuracy without manually testing network devices in the field.

In other embodiments, the analyses rules and algorithms may be based on different parameters and/or numbers of performing devices, such as, but not limited to, defining a node status by a predefined percentage of all local network devices reporting active or inactive (e.g., greater than 50 percent, less than 100 percent, greater than 0 percent, etc.), defining a node status by a predefined number of local network devices reporting active or inactive (e.g., greater than one, less than one, etc.), comparing the number of active local devices to the number of inactive non-local devices, comparing the number of active or inactive local devices to the number of active or inactive local devices of the immediate parent node upstream in the network, and the like.

For example, according to one embodiment, a node may be considered inactive if one or more local network devices indicate an inactive status, or in another embodiment, a node may only be considered inactive if all local devices are inactive. Similarly, in some examples, a node may be considered active if at least one local network device is active.

According to another embodiment, one or more device inactivity percentage thresholds may be defined against which the number of network devices that are local to a node are compared to classify the status of that node and/or the status of the corresponding portion of the network. For example, a predefined inactivity percentage threshold may be set to 50 percent, such that when more than 50 percent of the local network devices for a single node are reporting as inactive, the node itself may be classified as not achieving performance standards. Whereas under a more absolute paradigm, a single local network device reporting as active would be utilized to classify the entire node as active, under a percentage threshold analysis, the greater the number (and/or percentage) of network devices that are inactive, the more likely network service issues exist for that network node and/or proximate upstream network nodes or other devices. Comparing network statuses to a threshold may further allow identifying growing service issues that may be particular to a specific geography, notwithstanding whether complete outages at any of the network nodes are occurring. It is appreciated that the aforementioned example of a 50 percent inactivity percentage threshold is provided for illustrative purposes only, and that any other percentage may be provided and/or modified depending upon the intended purposes and service expectations of the network.

Figure 8A:
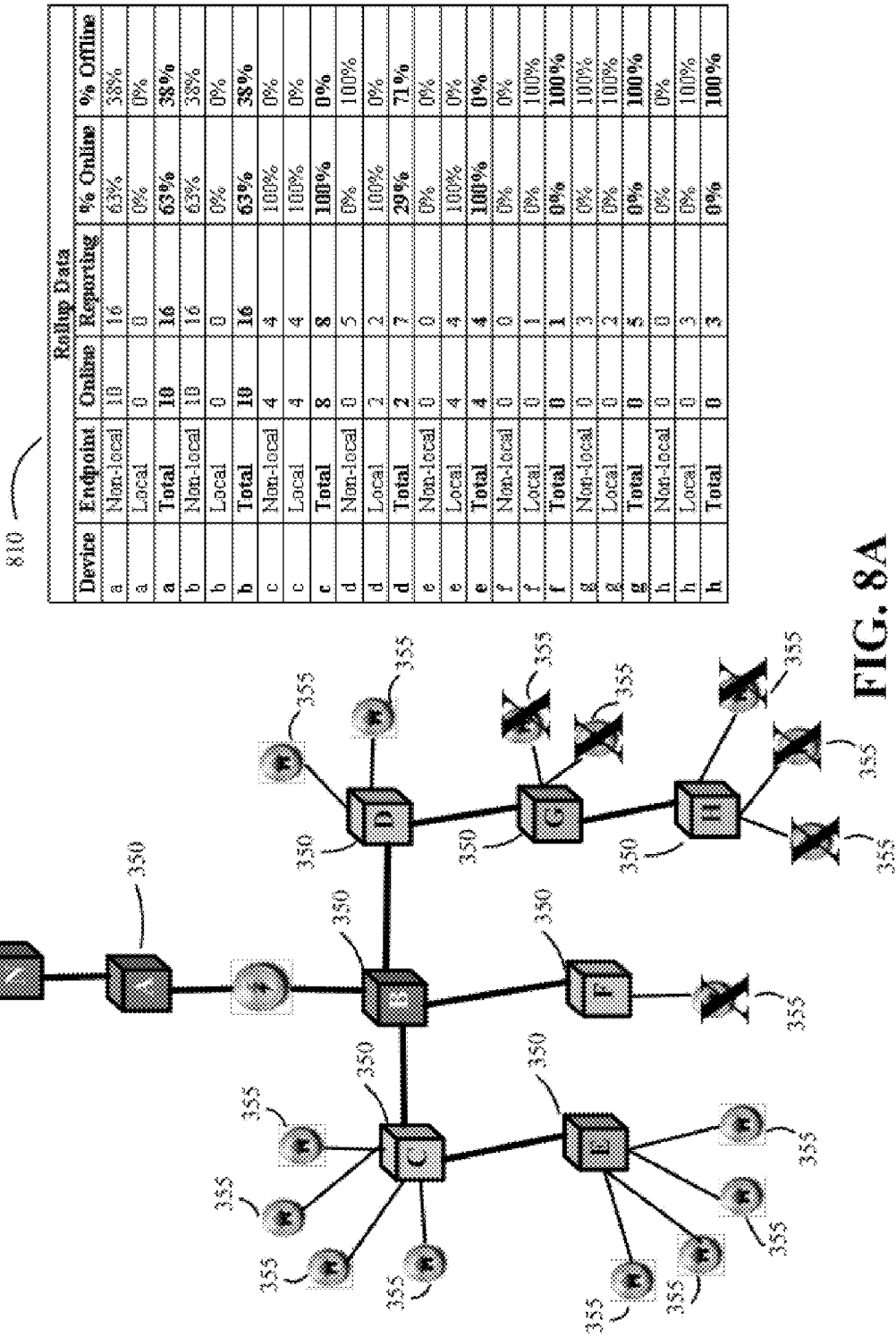
Figure 8B:
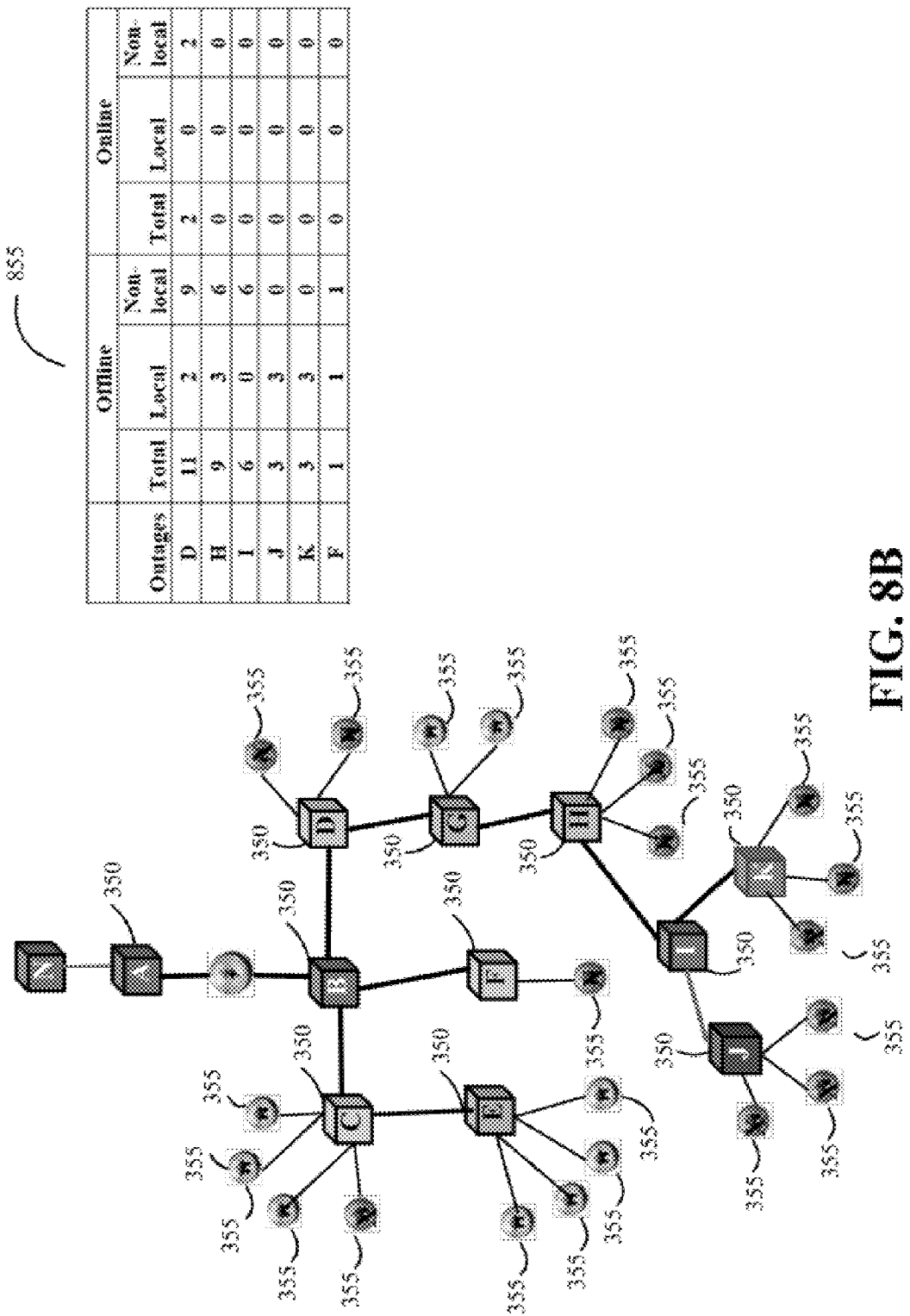

Additional details regarding example analysis rules and algorithms for identifying POIs based on network device activity upon being correlated with their relative location within the network topology are now provided with reference to FIGS. 8A-8C. With reference to FIG. 8A, an example network health topology 805 is shown, such as may be generated in response to the operations performed at block 505 of FIG. 5. The example network topology represents the same network topology that is illustrated in FIG. 3B, having a number of nodes 350 (nodes "A" through "H") and a number of endpoints 355 that are local and/or non-local to respective nodes 350. However, in this representation a subset of the endpoints 355 are represented by an "X" indicating an inactive status, while the others (without an "X") indicate an active status. Also shown in FIG. 8A is a chart 810 showing the corresponding numbers and statuses of local and non-local endpoints for each node 350, which is also referred to herein as "roll-up data." The roll-up data allows identifying one or more network POIs based on the statuses of local and non-local devices in each node and with respect to proximate nodes (e.g., parent-child nodes). Moreover, the roll-up data presented in the chart 810 allows tracking or otherwise monitoring groups of network devices (e.g., at the node level) based on the underlying dependent device statuses and dependency relationships. Presenting node level data simplifies presentation and analysis by reducing the number of data points to be considered.

According to one embodiment, the network provider system may be configured to analyze the network topology and roll-up data from the "bottom up"—beginning at the most peripheral node and working upstream along the network. For example, beginning at node "E" 350, the roll-up data and/or the network topology indicates that node "E" 350 is not associated with any non-local endpoints (or other network devices), because it is the last node 350 in the network along that branch. Node "E" 350 is associated with four local endpoints 355, each of which is indicating an active status. The chart 810 thus indicates that node "E" 350 has zero non-local endpoints and four local endpoints, 100 percent of which are online. Continuing upstream along the network, node "C" 350 similarly has four local endpoints 355 which are indicated as being active. However, because node "C" 350 is a parent to node "E" 350, it also has four non-local endpoints 355 associated therewith, which are the endpoints 355 that are local to node "E" 350. Notwithstanding, because both nodes have 100 percent active endpoints, these nodes can be considered active or healthy. Continuing upstream along the network, node "B" 350 introduces further complexity because it is a branch point with additional dependent nodes 350. Therefore, in one embodiment, the same process is repeated beginning from each of the most peripheral nodes 350 until the common nodes 350 are reached. For example, the next peripheral node is node "F" 350, which has one local endpoint 355. In this embodiment, the only endpoint 355 local to node "F" 350 is indicated as inactive. Thus, node "F" 350 is indicated in the chart 810 as being 100 percent inactive or offline.

Having thus identified at least one node 350 with all inactive local endpoints 355—node "G" 350—the network is traversed upstream to identify the next node 350 that indicates at least one active local endpoint 355, which may be indicative of a POI. In this example, node "D" 350 is the next node that indicates active local endpoints 355. In some embodiments, one or more active non-local endpoints 355 at a parent node 350 (or other upstream node 350) may also be indicative of an active node 350 (e.g., at least some service provided to one or more endpoints dependent upon that node 350), and thus that the POI is at a point on the network downstream from the active node 350. Accordingly, in this example embodiment, because node "D" 350 is associated with two active local endpoints 355, and because node "G" 350 is below node "D" 350 and node "G" 350 has no active endpoints, it may be determined that the first POI is at node "G" 350. In this example, node "H" is not a POI because node "G" 350, which is upstream from node "H" 350, also has no active local endpoints. Node "G" 350 is the POI because of the detection of active endpoints at node "D" 350 immediately upstream. In addition, according to some embodiments, the number of endpoints (active and/or inactive) may limit the ability to conclude that a POI exists. In this example, because node "F" 350 and node "B" 350 do not have a sufficient number of endpoints, a POI determination cannot be made for them. It is appreciated that the sensitivity and number of active/inactive and/or local/non-local endpoints required before the data can be utilized may vary from implementation as desired, and these examples are not to be limiting.

The same or similar analysis is performed beginning at the other peripheral node "H" 350. In this example, nodes "G" and "H" 350 both have 100 percent of their local endpoints 355 reporting an inactive state. Continuing upstream along the network, node "D" 350 has two endpoints 355, both of which are active, and five non-local endpoints 355 (the local endpoints 355 of nodes "G" and "H" 350), all of which are inactive. Accordingly, beginning with node "H" 350, the same POI is identified as existing at a point in the network downstream from node "D" 350, such as between node "D" 350 and node "G" 350, or at node "G" 350.

Accordingly, by applying the bottom-up approach illustrated in this example embodiment, the change in node activity status can be efficiently identified utilizing the data represented in the chart 810 and/or the data depicted by the network health topology 805. The transition from inactive node "G" to active node "D" allows quick identification of network POIs. Moreover, these POIs are intelligently determined and provide field service technicians and other operations personnel with a more specific assessment of the location and/or the device or devices to investigate to resolve network service issues.

FIGS. 8B-8C illustrate another example network health topology 850 and two charts 855, 860 providing network health assessments and corresponding roll-up data, respectively. According to this embodiment, each network node 350 that has all local endpoints 355 associated therewith reporting an inactive status, and all non-local endpoints 355 associated therewith reporting an inactive status, are captured in the chart 855 as potentially inactive nodes (or indicating, or otherwise included in, an outage), and are a beginning point from which to assess statuses of parent nodes 350 to identify POIs. In this example topology 850, nodes "D," "H," "I," "J," "K," and "F" 350 are potentially inactive, as shown in the chart 855. Thus, according to one embodiment, any one of these nodes 350 may be a POI. However, in some embodiments, further analysis is performed such that the network is analyzed at one or more nodes 350 upstream of the inactive nodes until a node is identified that either has active local endpoints 355 associated therewith or active non-local endpoints 355 associated therewith. Like the previously described embodiment, the portion of the network at or downstream from the point of transition between entirely inactive endpoints and at least one active endpoint can be identified as a POI on the network. The chart 860 illustrated by FIG. 8C indicates the count and status of local and non-local endpoints 355 for each node 350 as roll-up data, which can be utilized in a similar manner as described with reference to FIG. 8A.

Returning back to FIG. 5, the method 500 may end after collecting and analyzing the status nodes on the network and the corresponding local and non-local endpoints to determine one or more POIs. It is appreciated that, according to various embodiments, the operations method 500 may be repeated periodically to allow frequent monitoring and rapid identification of potential network service events.

Figure 6:
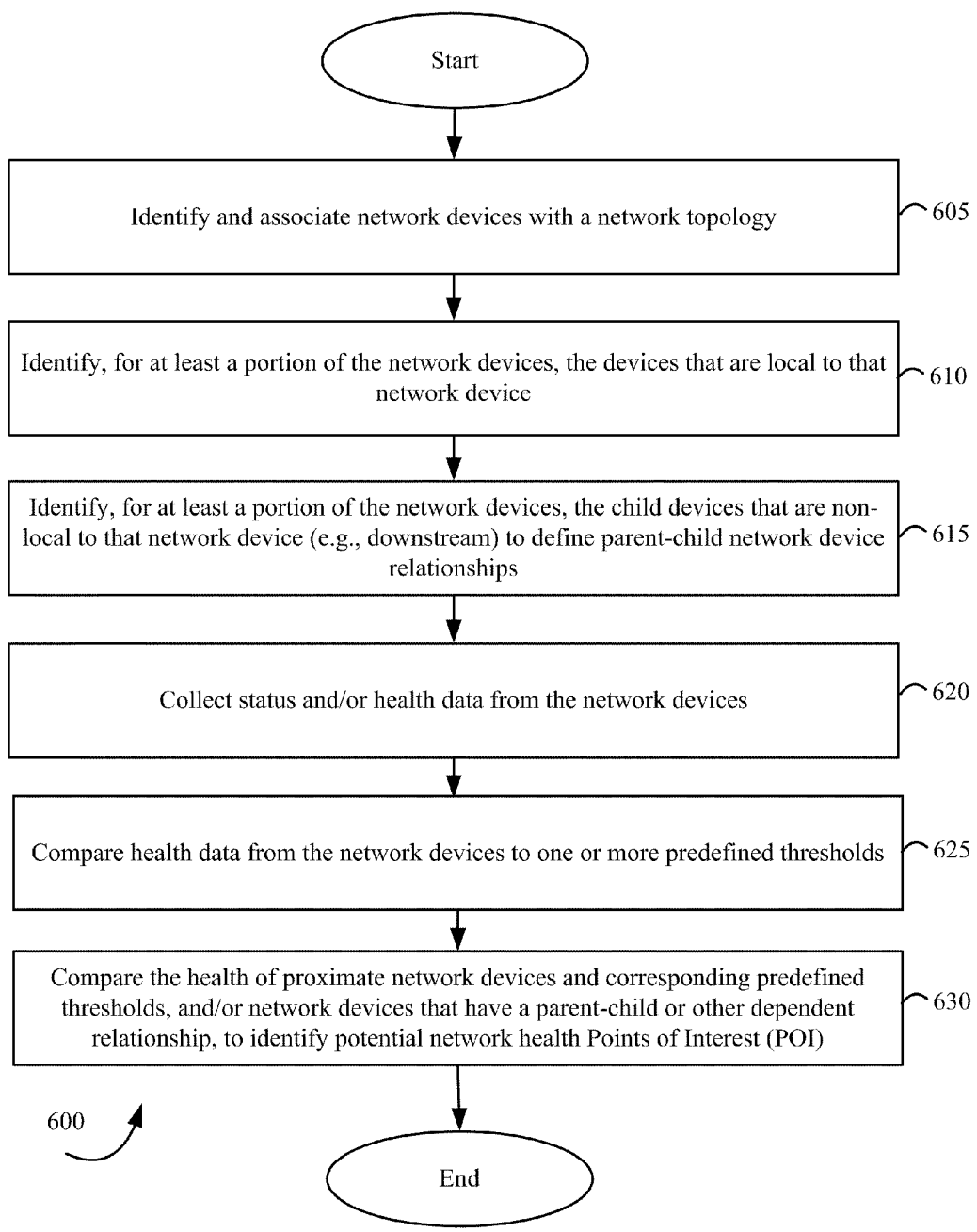
FIG. 6 is a flow diagram of an example method for analyzing network health comparing network device health to thresholds, according to an example embodiment.

FIG. 6 illustrates a flow diagram of another example method 600 for analyzing the status of a network by comparing network device performance levels to one or more thresholds, according to one embodiment, such as may be performed at least in part by the network health modules of the network provider system 102 described with reference to FIGS. 1-2. According to this embodiment, network device data is collected that indicates the relative performance levels, which allows identifying potential or anticipated network outages or service degradation prior to the actual occurrence of an outage or other service interruption identifiable by customers.

The method 600 may begin with blocks 605-615, in which the network devices and network topology are defined, including identifying parent-child relationships and counting devices that are local and non-local to other network devices, similar to that described with reference to block 505 of FIG. 5.

Following block 615 is block 620, in which the health or performance of each device on a network is collected. The health or performance indicators may include, but are not limited to, transmit/receive signal strength, modulation error ratio (e.g., upstream and/or downstream metrics, etc.), voice port loss of contact events, communications line or link errors, changes in one or more metrics over time, and the like. It is appreciated that the type of performance indicator may vary by device type being monitored, and thus is not limited to the aforementioned examples. Accordingly, by monitoring these types of performance levels, the health information may be utilized to identify degradations in performance that may not otherwise be identified until after an outage occurs.

Following block 620 is block 625, in which one or more of the performance indicators collected at block 620 are compared to corresponding predefined thresholds. According to various embodiments, some or all of the threshold values may be configurable such that they may be modified depending upon the desired network conditions. For example, the thresholds may vary per customer, per geography, per account type, and/or other characteristics, allowing different levels of service to be provided to different endpoints on the network. As one example, some endpoints may be assigned a lower threshold than others, such as if they are of certain preferred account types or have critical operations that depend upon network connectivity and service, or if there are known network conditions with which poorer performance is expected.

In some embodiments, each endpoint, node, and/or other network device is associated with one or more relative health conditions (e.g., percentage, high/medium/low, transmission rate, data loss, etc.), which may be displayed on a network health topology, such as those described with reference to FIGS. 8A-8C, and/or with roll-up data or other data presentations.

Following block 625 is block 630, in which the network provider system compares the relative performance of proximate network devices to identify one or more POIs on the network. Like the correlation techniques described with reference to FIG. 5, the relative performance of each network device and/or corresponding node can be compared to network devices upstream and downstream on the network. By identifying one or more network devices local to a given node that do not satisfy the corresponding predefined threshold(s), network degradation or growing service issues may be identified early without waiting until complete outages occur.

According to another embodiment of thresholding, techniques similar to those described with reference to FIG. 6 may be provided. For example, instead of comparing relative performance indicators of each network device to corresponding predefined thresholds, the number of network devices that are reporting off, inactive, or offline may be compared to predefined inactivity thresholds. In one embodiment, for each node, the number (or percentage) of inactive local network devices are compared to a threshold number (or percentage), which when violated indicates that the node or region is experiencing (or will soon experience) service degradation, outages, or other service events. The charts 810, 866 of FIGS. 8A and 8C are useful in capturing and/or representing the inactivity (labeled as "offline") percentages at each node, indicating both local inactivity percentages and non-local inactivity percentages. The greater the number (and/or percentage) of network devices that are inactive, the more likely network service issues exist for that network node and/or proximate upstream network nodes or other devices. Therefore, utilizing inactivity thresholds can also be helpful in identifying increasing numbers of individual devices that are experiencing service issues.

Thresholds may vary according to the type of device from which performance indicators are collected, the type of network, the information defined by the performance indicators, and the type or types of network events to be identified. The following table lists example thresholds and/or conditions that may be defined to indicate one or more network status events:

| POI type | Thresholds/conditions |
| --- | --- |
| Local POI: | Device has at least a preset number of monitored customers/devices; all local devices are inactive; parent device has one or more active local devices. |
| Network POI: | Device has at least a preset number of non-local monitored customers/devices that are inactive OR at least a preset number of local customers that are inactive; no local and non-local devices are active; parent device has one or more active local devices OR is an optical node. |
| Voice port loss of contact ("VPLOC") POI: | Optical node has at least a preset number of VPLOC statuses; parent device has at least a preset number of VPLOC statuses; optical node and parent node have the same number of non-local VPLOC statuses; the number of non-local devices with VPLOC statuses is less than the number of non-local devices with VPLOC statuses of the parent; device has at least a preset number of VPLOC statuses; parent device has at least a preset number of VPLOC statuses. |
| Trending POI: | Device is an amplifier or an optical node (or other device type in other embodiments); at least a preset number of devices are monitored; at least a preset number of homes do not satisfy one or more thresholds or other statuses; at least a preset percentage or ratio of devices downstream from the monitored device do not satisfy one or more thresholds or other statuses. |

It is appreciated that the above thresholds and/or conditions are provided for illustrative purposes and are not intended to be limiting.

Another example of thresholds may include transmission and receiving thresholds and/or MER thresholds. For example, upper and lower thresholds may be set for transmission rates, for receiving rates, and/or for MER ratios. The corresponding statuses of each of the individual monitored devices and/or groups of devices can be compared to these upper and lower thresholds if that information is available for the device type. In addition, according to one embodiment, a POI may be not be considered to have occurred until a predefined number (or percentage) of individual devices violate the threshold or thresholds. For example, in one embodiment, at least fifty percent of grouped devices (e.g., local, non-local, etc.) are to violate a threshold before a POI is indicated.

The method 600 may end after block 630, having compared network device status and/or performance to one or more predefined thresholds to identify one or more POIs and/or network areas with possible network service issues. As discussed, thresholding may be utilized to compare individual network device performance levels or to compare total numbers or percentages of inactive devices to inactivity thresholds.

Figure 7:
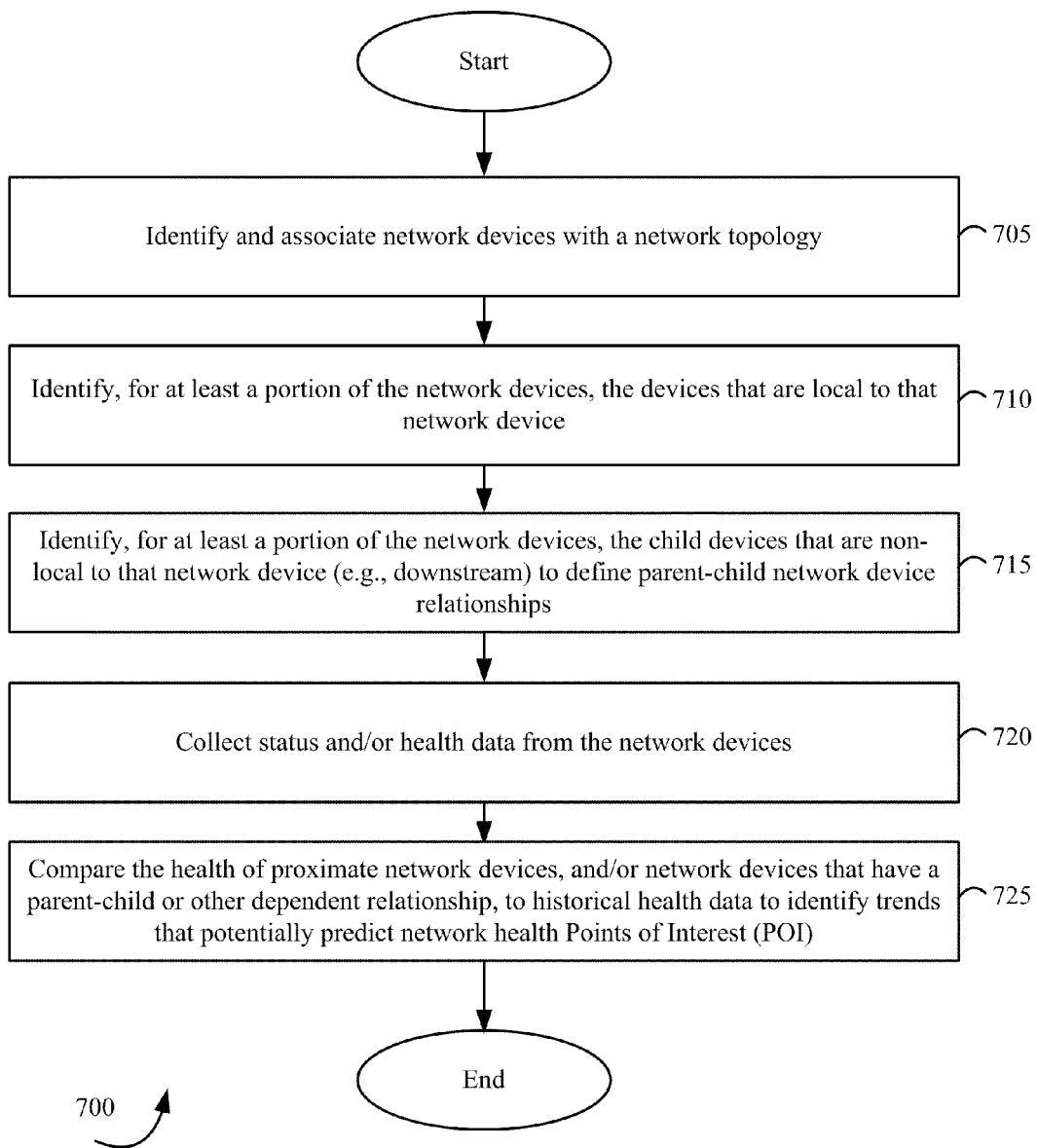
FIG. 7 is a flow diagram of an example method for identifying network health trends, according to an example embodiment.

FIG. 7 illustrates a flow diagram of another example method 700 for analyzing the status of a network by comparing network device status and/or performance levels to historical data to analyze network health trends, according to one embodiment, such as may be performed at least in part by the network health modules of the network provider system 102 described with reference to FIGS. 1-2. According to this embodiment, network device data that is periodically collected and stored is utilized for comparing subsequent network device data to identify network and/or network device trends. Analyzing device trends provides preemptive identification, and optionally preemptive servicing, of network devices prior to device failure or significant degradation.

The method 700 may begin with blocks 705-715, in which the network devices and network topology are defined, including identifying parent-child relationships and counting devices that are local and non-local to other network devices, similar to that described with reference to block 505 of FIG. 5.

Following block 715 is block 720, in which the current status and/or health of each network device is collected, such as is described with reference to the methods 500, 600 illustrated by FIGS. 5 and 6. Following block 720 is block 725, in which the status and/or health of the network devices are compared to historical status and/or health data for the same network devices. Historical status and/or health data may be stored in memory as network health topology snapshots and/or the corresponding data from which the network health topologies are generated. Accordingly, at block 725, the comparisons of current data to corresponding historical conditions and/or performance are made to identify any trends and allow predicting anticipated outages or degradations, such as, but not limited to, service event date and time, duration and clear times of other recent events, whether recent outages were sporadic, intermittent, or regular, or trends in device performance issues.

According to various embodiments, the intervals of data to which the current statuses are compared can be varied. For example, increasing the number of intervals generates more data points for analysis, but may also increase the inclusion of outlier conditions in the data set. Anomalies or outliers may be omitted by tracking the number of times a status changes, or by tracking the variance in the performance level changes. In other embodiments, mathematical operations, such as smoothing, averaging, analyzing the standard deviation, and the like may be performed when analyzing network health trends.

In addition, the stored historical data can also be analyzed to first identify the trends that statistically indicate a likelihood of service interruption and/or performance degradation, and in response set business and/or other rules based on these trends to identify potential POIs and/or create service tickets.

Like the correlation and thresholding analysis techniques described with reference to FIGS. 5-6, network trend identification can also include the utilization of network health topologies and/or roll-up data representing local and non-local network device statuses at different areas of the network. Comparing the behavior of proximate network devices to historical behavior of the same proximate devices can similarly be utilized to more specifically target POIs on the network.

Accordingly, the method 700 may end after block 720, having compared current network device status and/or health data to historical network health data to identify trends beneficial in predicting network degradation or service issues prior to outages or serious events actually occurring.

Figure 9:
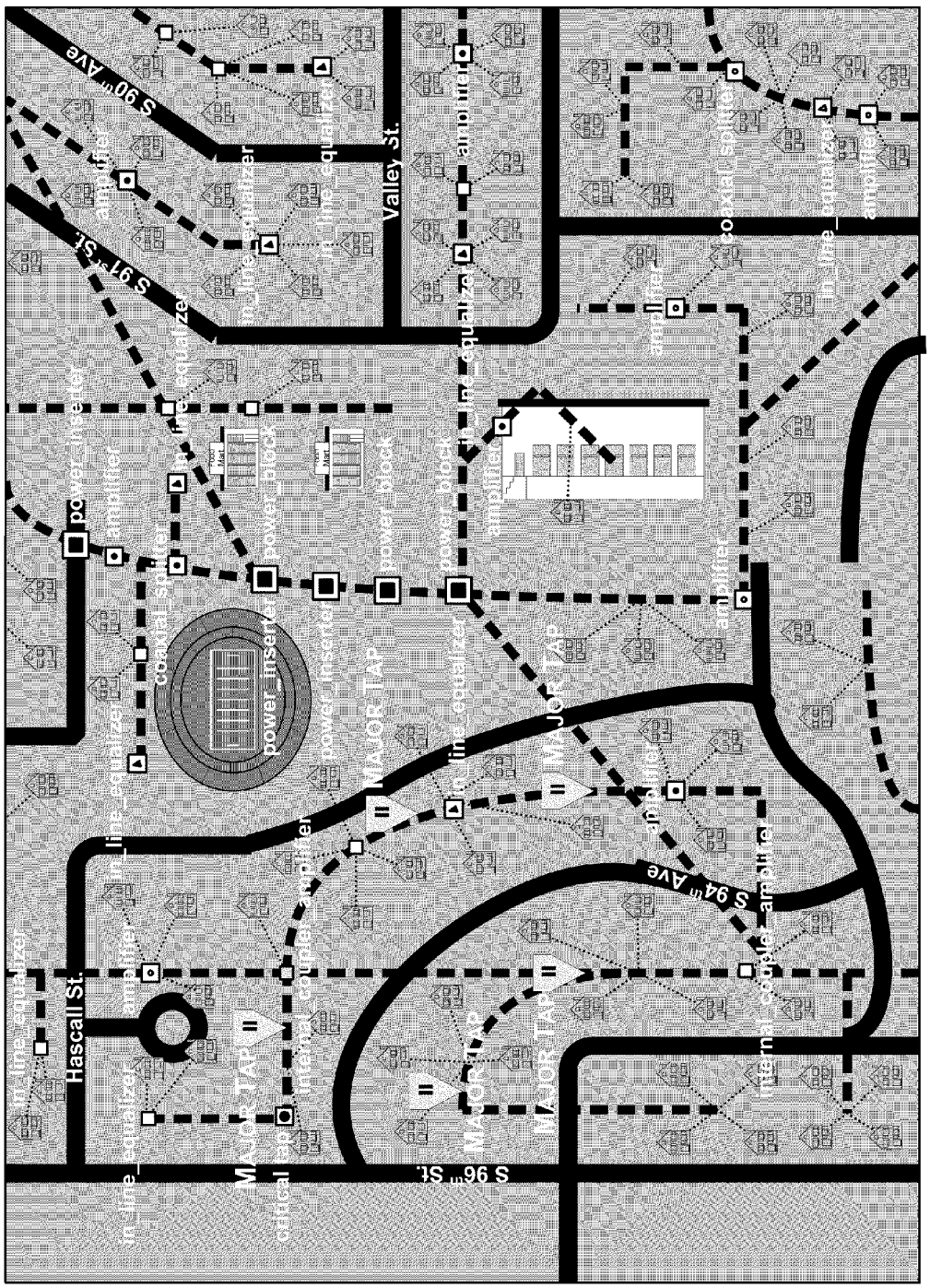
FIG. 9 is an example combined network health topology and geographical map, according to an example embodiment.

FIG. 9 illustrates an example combined network health topology and geographical map 900, according to one embodiment, such as may be generated by the network health modules of the network provider system 102 described with reference to FIGS. 1-2. As shown, a network health topology may be generated to represent an approximate layout of the network, and may include the individual network devices (e.g., nodes, endpoints, amplifiers, equalizers, splitters, power inserters, couplers, etc.). For one or more of the network devices, a representative status and/or health indication may also be shown. For example, the statuses (e.g., on/off, active/inactive, online/offline, etc.) collected at block 520 of FIG. 5, and/or the relative performance indicators collected at block 605 of FIG. 6, may be displayed by the network health topology. Similarly, indications of status and/or health trends may be displayed, such as are determined at block 725 of FIG. 7. In addition, any POIs that have been identified may be displayed on the map 900. POIs may be identified by identifying general areas or segments of the network and/or by identifying specific network devices.

The foundation of the network topology, such as the layout of the network and network device type and location, may initially be generated by the network provider's system of records, such as its network engineering maps and other network device/CPE information and data sources. The geographical map component may likewise represent the same or a similar area's geography, or a portion thereof, and may include, but not be limited to, streets, highways, residential houses, commercial buildings, trees, waterways, parking lots, train tracks, or other obstacles. The geographical map data can be taken from any available mapping service, such as, but not limited to, any geographic information system ("GIS"), any commercially available mapping system (e.g., web-based mapping systems, such as Google™ Maps, Google™ Earth, etc.), and the like.

Accordingly, a combined network health topology and geographical map can be useful to more effectively and quickly respond to network service events. By comparing the POIs and the actual network layout with the geographical layout, driving directions and network device access can be represented effectively. For example, unexpected network connections may have been made, such as through a backyard or from another branch of the network, which may not be apparent without overlaying the network topology with the geographical map.

It is further appreciated that, according to other embodiments, additional topologies may be provided with the network health topology and overlaid on a geographical map. For example, utilities topologies, such as power, gas, water, sewer, phone, etc., may be obtained from the respective utility service provider and overlaid with the geographical map. Providing additional utility information may be useful to field service technicians to avoid damaging or otherwise interfering with another utility service. In addition, correlating (e.g., visually displaying) additional utility information with the network health topology may provide independent information useful in diagnosing network service interruptions or degradations. For example, if a certain grouping of network devices is reported as inactive, but both downstream and upstream devices are active, a failure with an external dependency, such as a power failure, may be the cause for the network device failures.

It is appreciated that the aforementioned information and uses of a combined network health topology (and optionally other topologies) and geographical map are provided for illustrative purposes, and are not intended to limit the uses and types of information included in combined maps.

FIGS. 10A-10B illustrate example user interfaces 1005, 1050 for displaying network health statuses and information associated with network devices, according to various embodiments. These or similar user interfaces 1005, 1050 may be utilized by operations personnel, such as when analyzing or monitoring network health, manually generating service tickets, or otherwise facilitating network service. In addition, these or similar user interfaces 1005, 1050 can be accessed and utilized by field service technicians to facilitate responding to service tickets and performing field service.

With reference to FIG. 10A, according to one embodiment, the user interface 1005 may be configured to display active POI information 1010, network device details 1015 associated with each of the POIs displayed by the POI information 1010, revenue generating units impacted 1020 (e.g., the number of devices associated with unique services subscribed to by the customers), numbers and details of impacted local and non-local devices 1025 (or addresses) from each of the POIs displayed by the POI information 1010, and additional information links 1030.

The POI information 1010 may include, but is not limited to, device identifiers, a date/time stamp associated with the last analysis (e.g., when the last network health topology was generated or the most recent data polling, etc.), device type (e.g., CPE, amplifier, splitter, tap, etc.), parent device identifiers, parent device types, system node identifiers, POI levels of severity (e.g., high/low/medium, critical, non-critical, 0-10, etc.), numbers of impacted devices or addresses, local active and inactive counts and percentages, and non-local active and inactive percentages. It is appreciated that, according to other embodiments, different POI information may also be displayed in addition to, or instead of, those provided by example herein. For example, according to another embodiment, relative performance levels for each individual impacted device may be displayed, such as transmit/receive signal strength, modulation error ratio, voice port loss of contact events, etc., which will differ depending upon the network device type.

In addition, according to one embodiment, a filter or selection control 1035 may be included that allows filtering or otherwise controlling the types and/or numbers of POIs and associated information displayed. For example, a user may select the type of POIs, the type of service events, time/date ranges associated with the service events, priority levels, types of customers, geographies, and the like as filter or selection criteria, which can limit the POIs and corresponding information to those POIs associated with the filter or selection criteria. Filtering can be useful to limit an otherwise large number of POIs, to identify POIs caused by specific events, or to identify POIs associated with certain segments, geographies, etc.

With reference to FIG. 10B, a second user interface 1050 is illustrated, according to one embodiment. This user interface 1050 may be displayed with, an extension to, or otherwise associated with, the first user interface 1005 of FIG. 10A. This user interface 1050 may further display additional information associated with one or more POIs, such as a POI indicated in the POI information of the user interface 1005 of FIG. 10A. According to one embodiment, the user interface 1050 may be configured to display nearby address information 1055, upstream network device information 1060, and network device status information 1065 for each address associated with the designated POI. Nearby address information 1055 may be useful to facilitate coordinating field service calls or to identify other causes for service interruption or degradation (e.g., other infrastructure failure, such as power failure, etc.). The network device status information 1065 can display unique address identifiers, upstream nodes or network connection information, addresses, service types, number and types of devices/services provided to the customer at each address, overall status for each address (e.g., on/off, etc.), and relative network device performance levels, such as, but not limited to, reception rates, transmission rates, meter levels, and the like. I is appreciated that, according to other embodiments, different network device and/or address information may also be displayed in addition to, or instead of, those provided by example herein.

Accordingly, the previously described embodiments facilitate the identification of potential network service issues by using algorithms to analyze the network and associated network device status, to automatically generate a logical network health topology, and to correlate the network health topology with detailed network device information, customer information, and geographical information, providing a comprehensive view of the network status and detailed information regarding any POIs identifying a potential failure in the network. Using a network health topology and correlated data, actual and anticipated outages can be quickly isolated, precisely located, and ticketed for repair without human intervention, and in some instances before customers report service interruptions. These embodiments therefore allow for proactive attention to potential outages, faster resolution when outages occur, fewer unnecessary truck rolls and associated costs, improved network performance, and increased customer satisfaction.

Classifying and Locating Potential Power Outages

As briefly described above, in some instances, service issues that may initially appear to be a communications network outage or other failure may instead result from a power network failure. According to various embodiments of the systems and methods described herein, a communications network provider system can analyze activity statuses for different device types to classify a service issue as a possible power network outage instead of a communications network outage. The following FIGS. 12-18 illustrate example embodiments in more detail.

Figure 12:
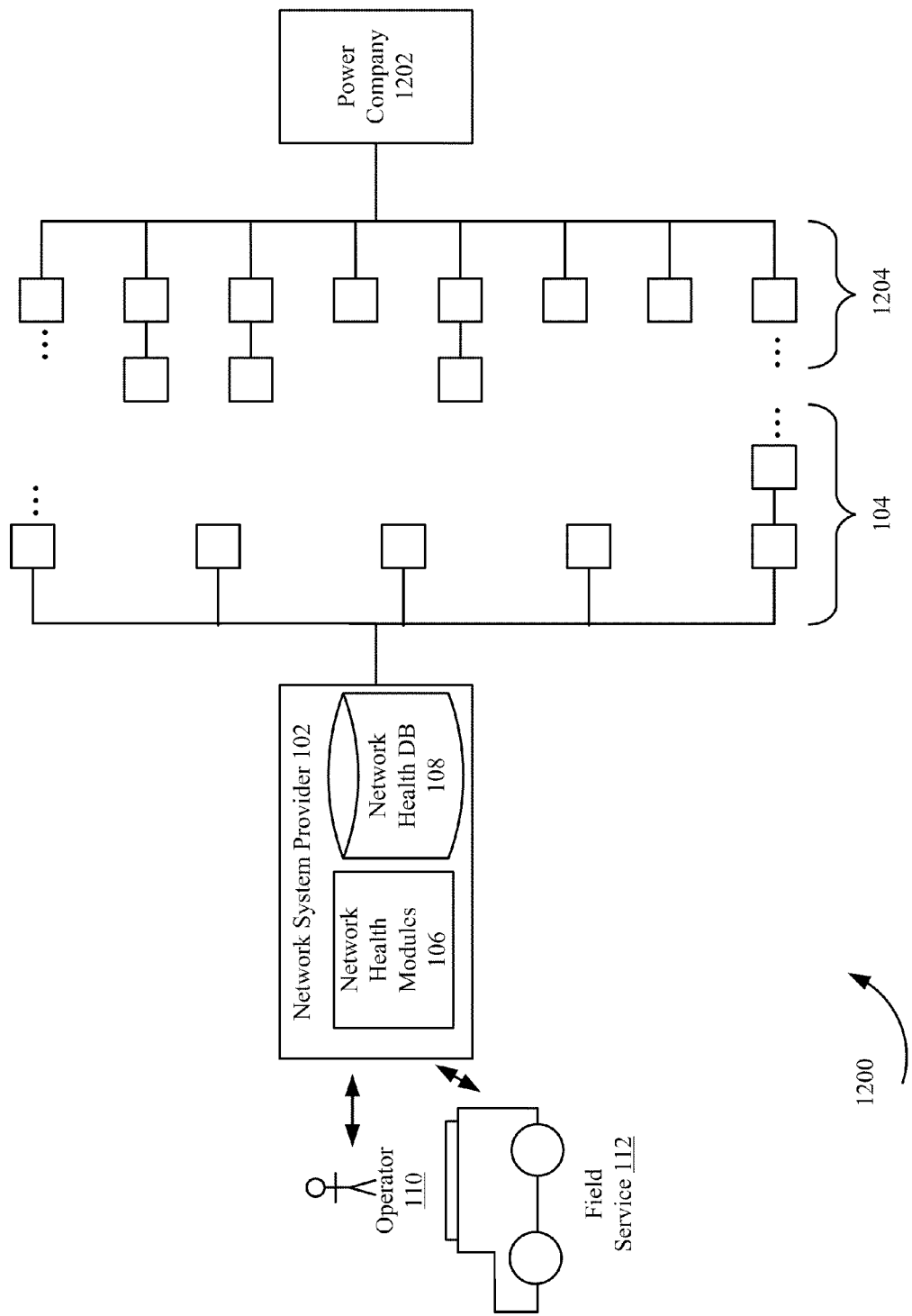
FIG. 12 illustrates an example system, according to another example embodiment.

FIG. 12 illustrates an example system 1200 for analyzing a possible power network failure according to communications network device statuses communicated over a communications network. The system 1200 is similar to the system 100 illustrated in and described with reference to FIG. 1, and may include one or more network providers and associated network provider systems 102 operable to transmit or otherwise provide network-based services over one or more networks 104, both of which are described in more detail with reference to FIG. 1. In addition, the system 1200 may include a power company 1202 operable to supply electrical power over one or more power networks 1204 (also referred to herein as a "power grid"). The power company 1202 may generate or otherwise supply power according to any available means, the specific details of which are immaterial to this disclosure. Likewise, the power networks 1204 may be any type of power network and be configured in any number of ways. The power network 1204 topology may differ from the topology of the communications network 104 topology. Thus, communications network device dependencies may not necessarily translate to the same device dependencies on the power network 1204. Accordingly, mapping a communications network 104 customer address to a location in the power network 1204 topology can allow detecting power network 1204 failures based on communications network 104 device statuses.

Figure 13:
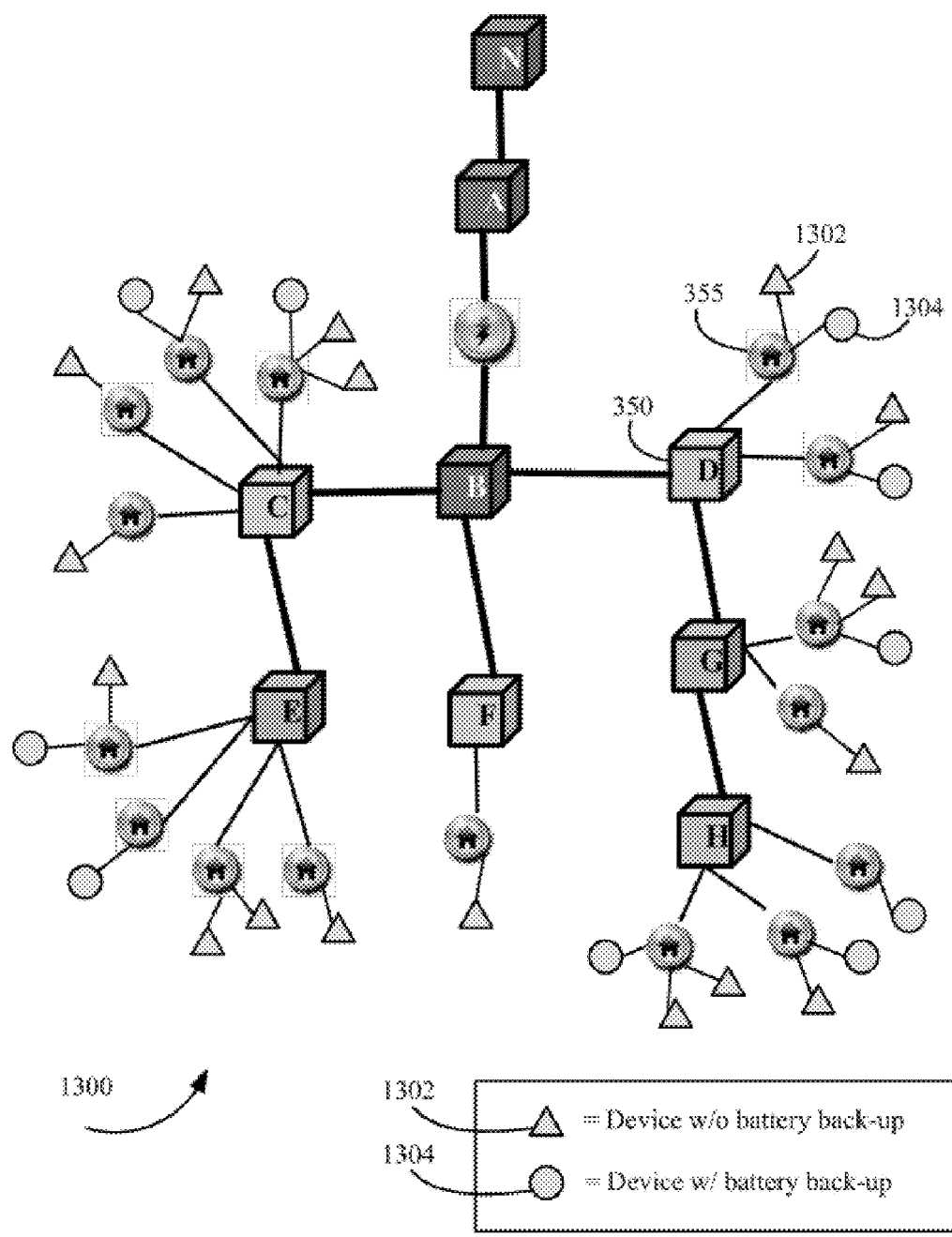
FIG. 13 is an example communications network topology diagram, according to an example embodiment.

FIG. 13 represents an example network topology 1300 of a communications network, similar to the network illustrated in and described with reference to FIG. 3B. According to this representation, the communications network may include a number of nodes 350 and one or more customer endpoints 355. According to this example embodiment, each endpoint 355 represents one or more network devices (e.g., CPEs, etc.) associated with a single address or service. At least a portion of the devices are network devices powered by a power network (not shown) without battery back-up capabilities. In addition, a portion of the network devices may receive their power from the power network but do have battery back-up capabilities that can be powered independent of the power network, such as when the power network is experiencing an outage or other failure. In the network topology 1300 shown, devices without battery back-up 1302 are represented by a triangle, and devices with battery back-up 1304 are represented by a circle. Example network devices without battery back-up 1302 may include, but are not limited to, a data modem, a set-top box, a television with a built-in receiver or a data modem, a computer, a media gateway, and the like. Example network devices with battery back-up 1304 may include, but are not limited to, a voice over Internet Protocol ("VoIP") modem, a multimedia terminal adapter ("MTA"), an embedded multimedia terminal adapter ("E-MTA"), and the like. Although specific network devices and CPE are referenced by example herein, these illustrative devices are not intended to be limiting and various embodiments may similarly be adapted for use with any other network device or CPE.

A network topology such as that illustrated in FIG. 13 can be analyzed by a network provider system in a similar manner as is described with reference to the prior embodiments for identifying a potential POI, such as at FIGS. 8A-8C. When analyzing the network topology to classify a POI as a potential power failure, however, the types of network devices that are reporting their status information and additional details about how the network devices are powered are also analyzed. For example, if one or more of the network devices without battery back-up 1302 associated with the endpoints 355 off of nodes "D," "G," or "H" 350 are reported as offline, but at least one of the network devices with battery back-up 1304 associated with the same endpoints are reported as active and online, a POI may be identified, but it may then be concluded that the communications network is healthy and that a possible power network failure exists and classified accordingly. Otherwise, a communications network failure would prevent any of the devices 1302, 1304 from being reported as online, not just those without battery back-up capabilities 1302.

According to some embodiments, the network topology 1300 is analyzed by the network provider system to detect upstream and downstream relationships between network devices indicated as active and inactive. By analyzing the upstream and downstream relationships of network devices indicated as active and inactive, an intelligent conclusion can be achieved regarding the status of the communications network and the status of the power network. For example, by analyzing the network topology 1300 in a bottom-up approach, similar to that described with reference to FIGS. 8A-8C, the network provider system can identify the segment within the network where service issues begin and, thus, more intelligently identify the location of a potential power network failure. Although a power network topology may not match a communications network topology, analyzing the communications network topology may at least be useful to identify groupings of proximate customer endpoints suffering service issues. If these issues are classified as potential power network failures, then at least a portion of those endpoint addresses can be mapped to a power network topology grid to identify the components or portions of the power network that may be the cause for the power network failure.

Figure 14:
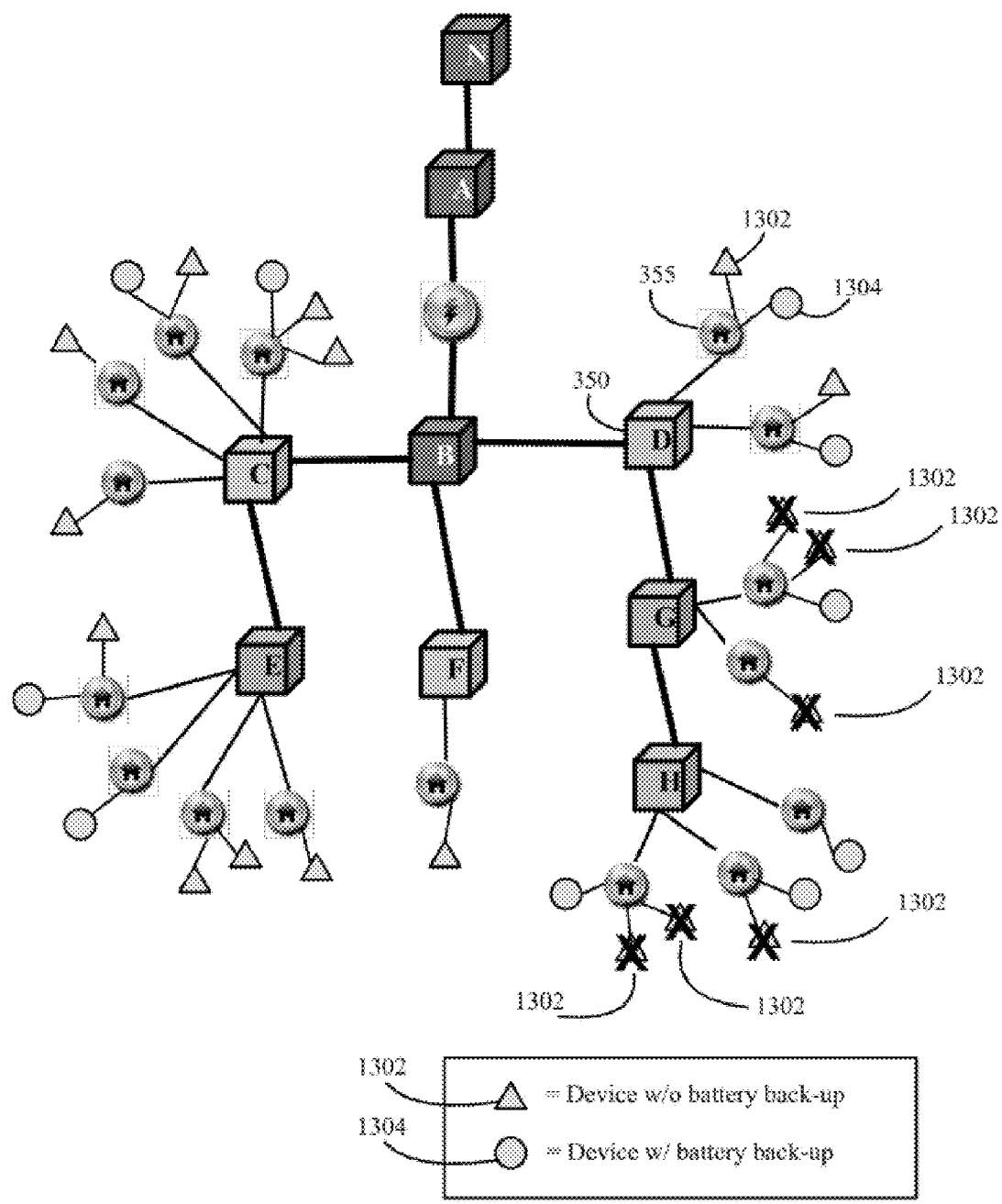
FIGS. 14-15 are example communications network topology diagrams illustrating inactive network devices, according to example embodiments.

FIG. 14 illustrates an example communications network topology, like that illustrated in FIG. 13, but including "X" marks indicating which network devices are reporting inactive or offline in an illustrative example. In one embodiment, a network provider system may begin to analyze the most peripheral node or node 355 and the associated network device statuses. If devices without battery back-up 1302 are reporting inactive and the devices with battery back-up 1304 are reporting active, then the network provider system continues to analyze the network upstream until devices without battery back-up 1302 are reporting active. In this manner, the network provider system can identify a portion of the network where a potential power network failure may exist. According to this example, each of the network devices without battery back-up 1302 associated at customer endpoints 355 for nodes "G" and "H" 350 are reporting as inactive, and all devices with battery back-up 1304 are reporting as active or online. However, at node "D" 350, all network devices without and with battery back-up 1302, 1304 are reporting as active. Accordingly, because, along the same network, at least one device downstream from node "D" 350 is able to report its status as active, it may be concluded that any service issues result from the power network and not from the communications network, and thus the service issue (e.g., a POI as described earlier) can be classified as a power network failure.

Moreover, obtaining and mapping or otherwise comparing the addresses for all or a portion of the endpoints 355 associated with nodes "G" and "H" 350 to a power network grid topology will allow the network provider system to locate and identify one or more components or segments of the power network that may be causing the failure. Similar to identifying the POI in a communications network described above, the power network grid topology can be analyzed, beginning with the peripheral addresses and working upstream along the power network to locate and identify a power network component or portion of the power network on which all (or most, a portion, etc.) of the customer endpoints depend. The upstream power network component or segment can thus be identified as being the potential cause for the failure within the power network. As discussed, because the communications network and the power network topologies may not exactly align, what may be upstream in the communications network may not necessarily be upstream in the power network. For example, with continued reference to FIG. 14, it may be that on the power network the customers associated with node "H" 350 are upstream of the customers associated with node "G" 350. However, the network provider system can intelligently navigate the power network because it will have access to a power network grid topology and corresponding data, such as addresses, installed equipment, device dependencies, and the like.

It is appreciated that the example shown and described with reference to FIG. 14 is provided for illustrative purposes only. In other embodiments, different logic may be applied to analyze whether a power network failure may exist. For example, although FIG. 14 shows all downstream devices with battery back-up 1304 online, in other examples, the network provider system logic may not require that all devices with battery back-up 1304 be active, but instead may require that at least one, at least or greater than a predetermined threshold, at least or greater than a predetermined percentage, etc. Similarly, the logic may not necessarily require that all devices without battery back-up 1302 be inactive. For example, in other embodiments, at least a predetermined percentage are to be inactive, fewer than a predetermined threshold can be active, etc. The existence of some network devices without battery back-up 1302 but still reporting online, even during a power network failure, may exist in a variety of circumstances, such as at locations with generator back-up power or locations that are powered by a different and unanticipated portion of the power network, etc. Accordingly, in some embodiments, programming logic may be executed by the network provider system that considers one or more of the following when analyzing potential power network failures: a predetermined threshold of network devices without battery back-up 1302 reporting; a predetermined threshold of network devices with battery back-up 1304 reporting; a predetermined threshold of network devices without battery back-up 1302 reporting inactive; less than a predetermined threshold of network devices without battery back-up 1302 reporting active; a predetermined percentage of network devices without battery back-up 1302 reporting inactive; less than a predetermined percentage of network devices without battery back-up 1302 reporting active; at least one network device with battery back-up 1304 reporting active; a predetermined threshold of network devices with battery back-up 1304 reporting active; less than a predetermined threshold of network devices with battery back-up 1304 reporting inactive; a predetermined percentage of network devices with battery back-up 1304 reporting active; less than a predetermined percentage of network devices with battery back-up 1304 reporting inactive; the proximity of network devices; the number and type of network devices 1302, 1304 upstream reporting active and inactive; the number and type of network devices 1302, 1304 downstream reporting active and inactive; network device status and/or trending data representing conditions over time; whether other device statuses or collected data may indicate a communications network failure (e.g., a VPLOC or other device failure that may be primarily powered by the communications network, etc.); whether other device statuses or collected data may indicate a power network failure; network status information obtained from a power supplier; network status information obtained from a field service technician; or network status information obtained from a customer.

Figure 15:
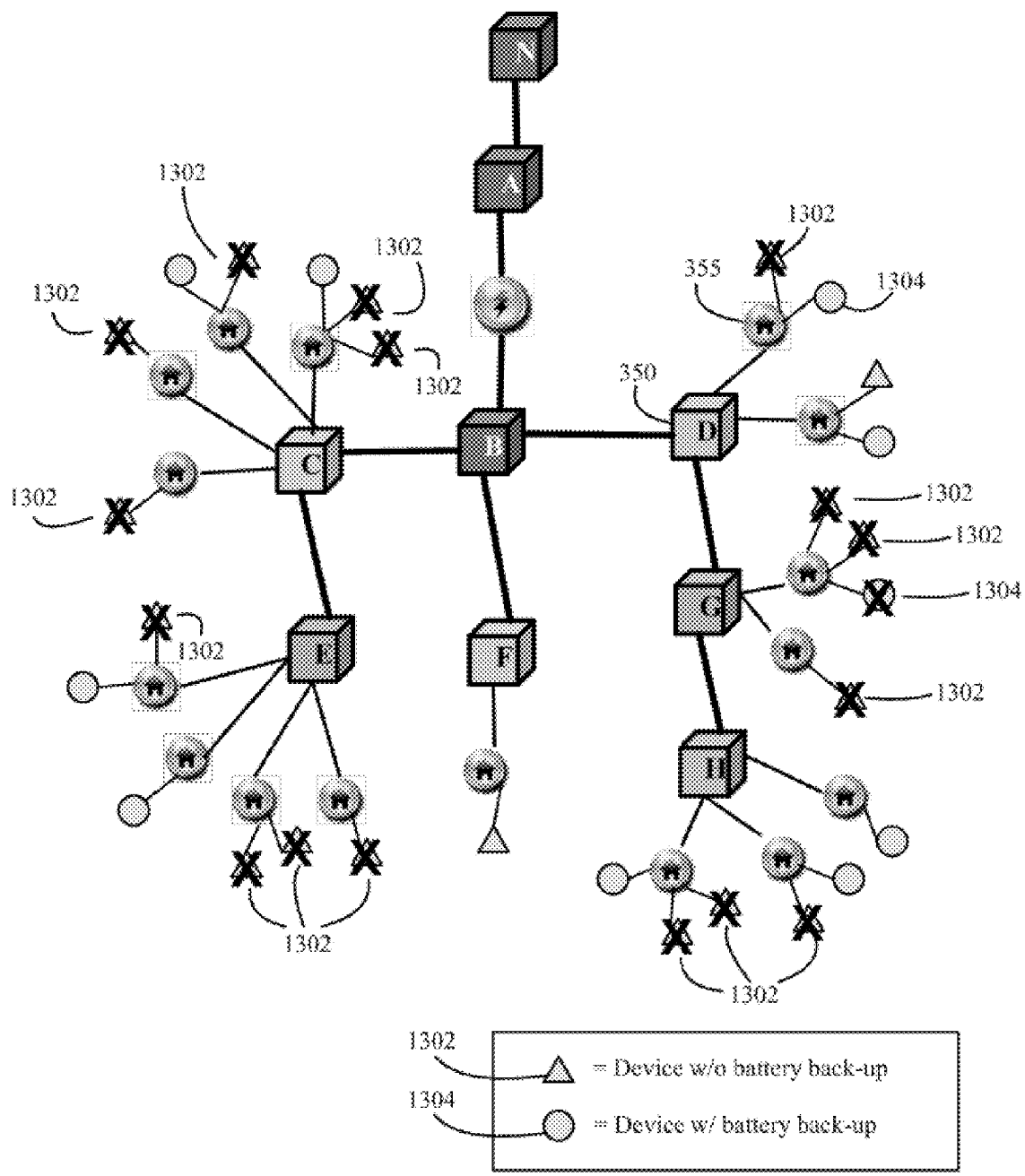

FIG. 15 illustrates another example communications network topology, similar to that illustrated in FIG. 14 with "X" marks indicating which network devices are reporting inactive or offline in an illustrative example. In this example, all but one of the network devices without battery back-up 1302 that are associated with nodes "H," "G," "D" 350 indicate inactive statuses, and all of the network devices with battery back-up 1304 associated with the same nodes "H," "G," "D" 350 are reporting active statuses. As previously discussed, the one network device without battery back-up 1302 that is reporting active may be the result of a power generator back-up at that customer location or that location receiving power from a different segment of the power network that may still be in service.

In one embodiment, the network provider system may analyze these status results and determine that more than a predetermined threshold (or percentage) of inactive devices without battery back-up 1302 are indicated as inactive and, thus, continue to process this scenario as a potential power network failure. In doing so, the one network device without battery back-up 1302 reporting as active is considered an outlier. Essentially, because enough devices are consistently indicating a possible power network failure, the network provider system may treat it as such.

In another embodiment, the network provider system may conclude that two potential power network failures exist, whereby the one network device without battery back-up 1302 that is active drives the conclusion that the two are potentially independent events. For example, the network provider system may conclude that the grouping of customer endpoints 355 associated with nodes "H" and "G" 350 are associated with one potential power network failure while the customer endpoint 355 associated with node "D" 350 has one network device without battery back-up 1302 that is indicated as offline, and one network device with battery back-up 1304 that is indicated as online is associated with a separate power network failure. However, in this simplified example, it may also be likely that the network provider system concludes that there are not enough reporting devices in this second grouping associated with node "D" 350 to arrive at any reliable conclusion, whether it be a potential POI failure or a potential power network failure. If, however, a greater number of total network devices were reporting, such as a number greater than a predetermined threshold or a percentage of devices without battery back-up 1302 were indicated as inactive and network devices with battery back-up 1304 were reporting as active, then the network provider system may more reliably classify the service issues as a potential power network failure.

In another embodiment, analyzing the other side of the network topology of FIG. 15, a network provider may identify and classify yet another potential power network failure associated with the customer endpoints from nodes "E" and "C" 350. In this example, all of the network devices without battery back-up 1302 are inactive, and all but one of the network devices with battery back-up 1304 are active. Because at least a predetermined threshold of network devices with battery back-up 1304 are active, the one device 1304 indicated as inactive may be ignored as an outlier. Reasons for network devices with battery back-up 1304 that are inactive without a communications network failure may include, but are not limited to, battery failure at the network device, a powered off network device, a failed network device, and the like.

It is appreciated that the previous examples indicating potential network failures on communications network topologies are provided for illustrative purposes and are not intended to be limiting. As mentioned, any number of rules and logic may be applied that considers network device activity status and whether the devices have battery back-up capabilities.

Figure 16:
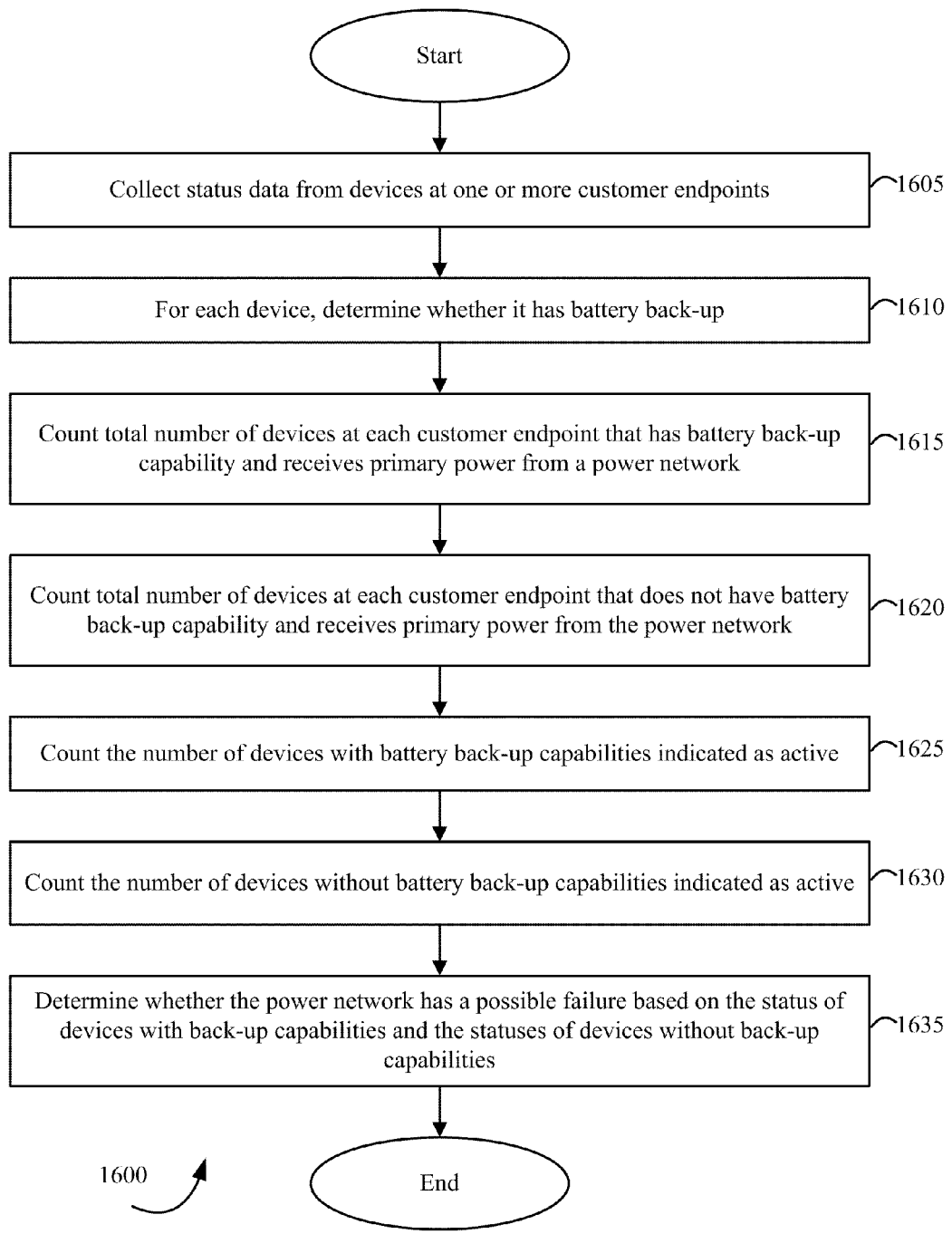
FIG. 16 is a flow diagram of an example method for classifying a possible power network failure, according to an example embodiment.

FIG. 16 illustrates a flow diagram of an example method 1600 for classifying a possible power network failure based on status information received from communications network devices, according to one embodiment, such as may be performed at least in part by the network health modules of the network provider system 102 described with reference to FIGS. 1-2. Generally, as a communications device network statuses are analyzed one or more POIs may be identified an a similar manner as described with reference to FIGS. 4-8C, and subsequently classified as a possible power failure instead of a communications network failure because of the activity statuses of network devices having battery back-up.

The method 1600 may begin at block 1605, in which activity status data from multiple communications network devices is collected over the communications network. According to one embodiment, these network devices may be CPE devices or other devices installed or associated with customer endpoints. However, in other embodiments, activity status data may also be collected from other network devices in addition to CPE devices. As described with reference to FIG. 13, the multiple network devices may be network devices without battery back-up capabilities 1302 and devices with battery back-up capabilities 1304. According to various embodiments, the activity status information received may be periodically transmitted by each of the network devices, polled from the network devices by the network provider system, or be obtained from other communications (e.g., content transmissions, on/off, etc.) between the network provider system and each of the network devices. It is further appreciated that, in some embodiments, network devices that are inactive or offline may not actually report any data, and the network provider system is operable to assign an inactive status based on the unmet expectation of receiving an activity status from offline devices. It is appreciated that any number of means for determining network device status may be utilized. The aforementioned examples are provided for illustrative purposes only and are not intended to be limiting.

Following block 1605 is block 1610, in which it is determined for each network device analyzed whether the device has battery back-up capabilities or not. According to one embodiment, network device information is stored by the network provider system and can be referenced to determine which devices have battery back-up capabilities. In some embodiments, the status information received from each of the network devices indicates whether the devices are operating on battery back-up. For example, devices with battery back-up capabilities 1304 may communicate either an active status that indicates it is powered by the external power network or an active status that indicates it is powered by its battery back-up.

At blocks 1615-1630, the total numbers of reporting devices as well as the types and statuses of each device type are analyzed to facilitate identifying a potential power network failure. For example, at blocks 1615 and 1620, the numbers of devices with battery back-up 1304 and the numbers of devices without battery back-up 1302 are counted, respectively. The numbers may be associated with each customer endpoint, with each network node, branch, or other network segment, or generally aggregated as desired. By understanding the total numbers and associated addresses of each type of device, the network provider system can determine the numbers of each type that are not reporting as well as locate them on the communications network and identify their dependencies on each other and their respective location and dependency on the communications network. Thus, at blocks 1625 and 1630, the numbers of devices with battery back-up 1304 and the numbers of devices without battery back-up 1302 that are active are counted, respectively, according to one embodiment. In other embodiments, the numbers of devices 1304, 1302 that are not active may be counted, or both statuses may be counted.

Following block 1630 is block 1635, in which the network provider system analyzes the activity status and device type counts determined in the preceding operations to determine whether a potential power network failure may exist. As previously described with reference to FIGS. 13-15, any number of rules or programming logic that depends upon comparing the statuses of devices with battery back-up 1304 with the statuses of devices without battery back-up 1302 may be implemented to classify a service issue as a power network failure rather than a communications network failure. In a generalized example, if many or all of the devices without battery back-up capabilities 1302 associated with a segment of the communications network are indicated to be inactive or offline, but at least one (if not most or all) of the devices with battery back-up capabilities 1304 connected to the same network segment indicate they are active but powered by their battery back-up, then it may be concluded that the communications network is operating effectively but the power network may possibly be experiencing a failure. According to various other embodiments, a number of other device status combinations and applied thresholds may allow classifying a potential power network failure, such as described by example with reference to FIGS. 13-15. Moreover, the thresholds and associated programming logic may be configurable to allow altering or customizing the required conditions to classify a potential power network failure.

The following example set of conditions may be utilized for analyzing the activity status of devices on a communications network to classify a potential power failure, according to one embodiment. In this embodiment, each location or segment of a communications network is analyzed (which may generally be referred to as a device, such as a tap servicing one or more customer endpoints), such as at each node or network device or at each customer endpoint.

| POI type | Thresholds/conditions |
|---|---|
| Power Network Outage POI: | Location/network segment (e.g., node, tap, or endpoint) has: all local devices with battery back-up 1304 reporting as active; all local devices without battery back-up 1302 are inactive; all devices without battery back-up 1302 at the parent device are active or the parent device is an optical node; and at least a preset number of non-local, downstream devices without battery back-up 1302 are inactive. |

Referencing the above example, according to other embodiments, instead of all local devices with battery back-up 1304 reporting as active, the programming logic may only require a predetermined number or percentage (e.g., if not all, most, etc.) to be active. Similarly, the programming logic may require a predetermined number or percentage of local devices without battery back-up 1302 to be inactive (e.g., if not all, most, etc.).

Accordingly, the above example logic allows identifying a specific location or area of the communications network that may indicate a corresponding area or portion of the power network that may be causing the failure. More specifically, by traversing the communications network upstream until a segment is identified where local devices without battery back-up 1302 are inactive but parent devices without battery back-up 1302 are reporting as active, the area or the location of a potential point of failure is identified.

According to various other embodiments, additional data can be analyzed in addition to that described above to improve the reliability of the conclusions reached regarding possible power network failures. For example, according to one embodiment, if more recently gathered data (e.g., from a real-time or near real-time CPE device status system) and/or different data sources indicate one or more devices without battery back-up 1302 are active, then the network provider system may re-classify the service event from a possible power network failure to another type of failure (e.g., a communications network POI, etc.). Similarly, if other data sources corroborate or provide further evidence of a power network failure, or that the problem is increasing or growing in magnitude or volume, then a severity level associated with any resulting service ticket or technical response may be increased.

The preceding logic for classifying a power network failure and the potential location of the failure is similar to that described in the above embodiments for identifying a POI on a communications network, and can incorporate some or all of the aspects described therefor, in various embodiments.

Accordingly, the method 1600 may end after having classified communications network device inactivity as a potential power network failure. Upon identifying this failure, network provider system data can be updated, service tickets created or updated, and/or a field service response initiated. Moreover, in many instances, because the cause of service interruptions may be due to a power network failure, the identification of this potential power network failure by the network provider system may be transmitted to a responsible power supply company or associated third-party for responding to the failure.

To further facilitate rapid and accurate identification classification of possible power network failures, one embodiment may include locating one or more components of a power network as a potential cause for a power network failure. Generally, in this embodiment, because the network provider system is operable to identify devices likely experiencing a power failure, as described with reference to FIGS. 12-16, correlating the addresses associated with those devices with locations on a power company's power network grid topology will allow automatically analyzing the power network to locate potential failed components and/or network segments.

Figure 17:
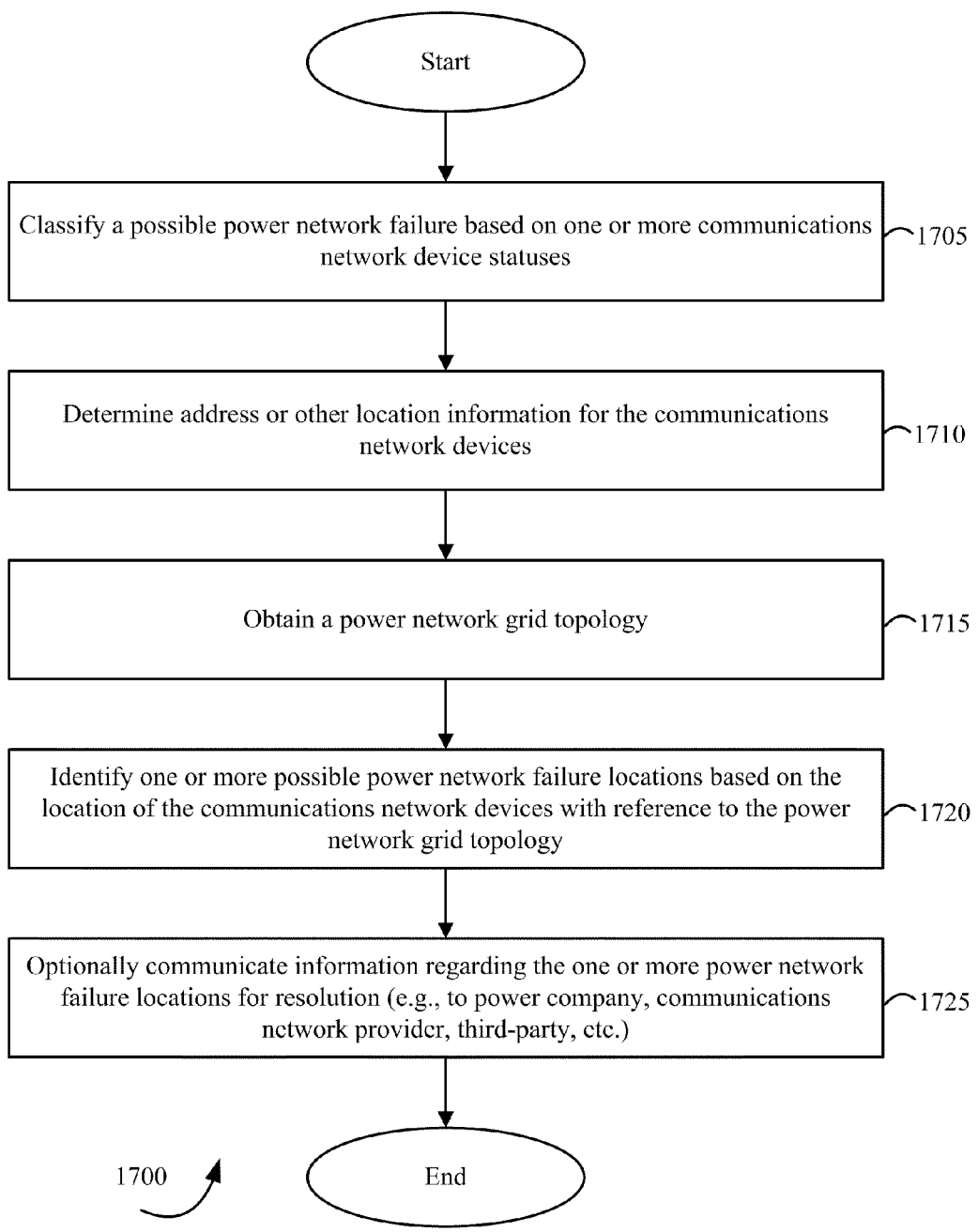
FIG. 17 is a flow diagram of an example method for locating a cause of a possible power network failure on a power network grid topology, according to an example embodiment.

Accordingly, FIG. 17 illustrates a flow diagram of an example method 1700 for locating a possible point of failure on a power network based on device status information received over a communications network, according to one embodiment, such as may be performed at least in part by the network health modules of the network provider system 102 described with reference to FIGS. 1-2.

The method 1700 may begin at block 1705, in which a possible power network failure is classified according to the various embodiments described herein, such as described with reference to FIGS. 13-16. Following block 1705 is block 1710, in which the address information for at least a portion of the customer endpoints experiencing power failures is obtained. Customer address information may be obtained from the network provider system's customer records, CPE device records, and the like.

Next, at block 1715, a power network grid topology is obtained. The grid topology may be obtained from the responsible power supply company, from third parties, from public records, and the like. As one example, because the network provider system is able to rapidly identify potential power network failures and locations without requiring the installation of additional monitoring or reporting hardware, power supply companies may be willing to share the power grid information in exchange for status updates.

At block 1720, the address information, typically customer endpoint addresses, for the network devices experiencing possible power failures is correlated by the network provider system to locations within the power network grid topology, which also typically correspond to customer locations. Accordingly, upon correlating the communications network device addresses with address locations within the power network grid topology, the network provider system can analyze the power network grid topology to identify common power network components or segments that are upstream and upon which the affected devices depend. Analyzing the network may be done automatically according to techniques similar to those described with reference to analyzing a communications network by walking-up the network from downstream devices or locations to upstream devices or locations in the power network until a common power network component or network segment is identified that is immediately upstream of the affected addresses.

Following block 1720 is block 1725, in which information associated with the possible power network failure, the one or more power network failure locations (e.g., affected addresses, etc.), and/or the one or more power network components identified at block 1720 as potentially contributing to the failure, may be provided to the power supply company or any other system or entity associated therewith. In addition, in some embodiments, information related to the possible power network failure may be communicated to the communications network provider system or another system or entity associated therewith, such as for reporting or for updating service tickets and/or field service technicians. It may also be desirable to share the information with one or more other third parties, such as regulatory agencies or reporting agencies. Information may be communicated to one or more of these systems or entities according to any known communication protocol, such as, but not limited to, electronic communications over a network (e.g., the Internet, a telephone network, a private network, etc.) performed in real-time, in near real-time, or in batch mode, or periodic data transfer utilizing a memory device or devices transferred between the systems (e.g., disk transfers, tape transfers, hardcopy reports, etc.).

The method 1700 may therefore end after locating one or more power network components or network segments that may be contributing to the cause of service issues classified as a possible power network failure.

Figure 18:
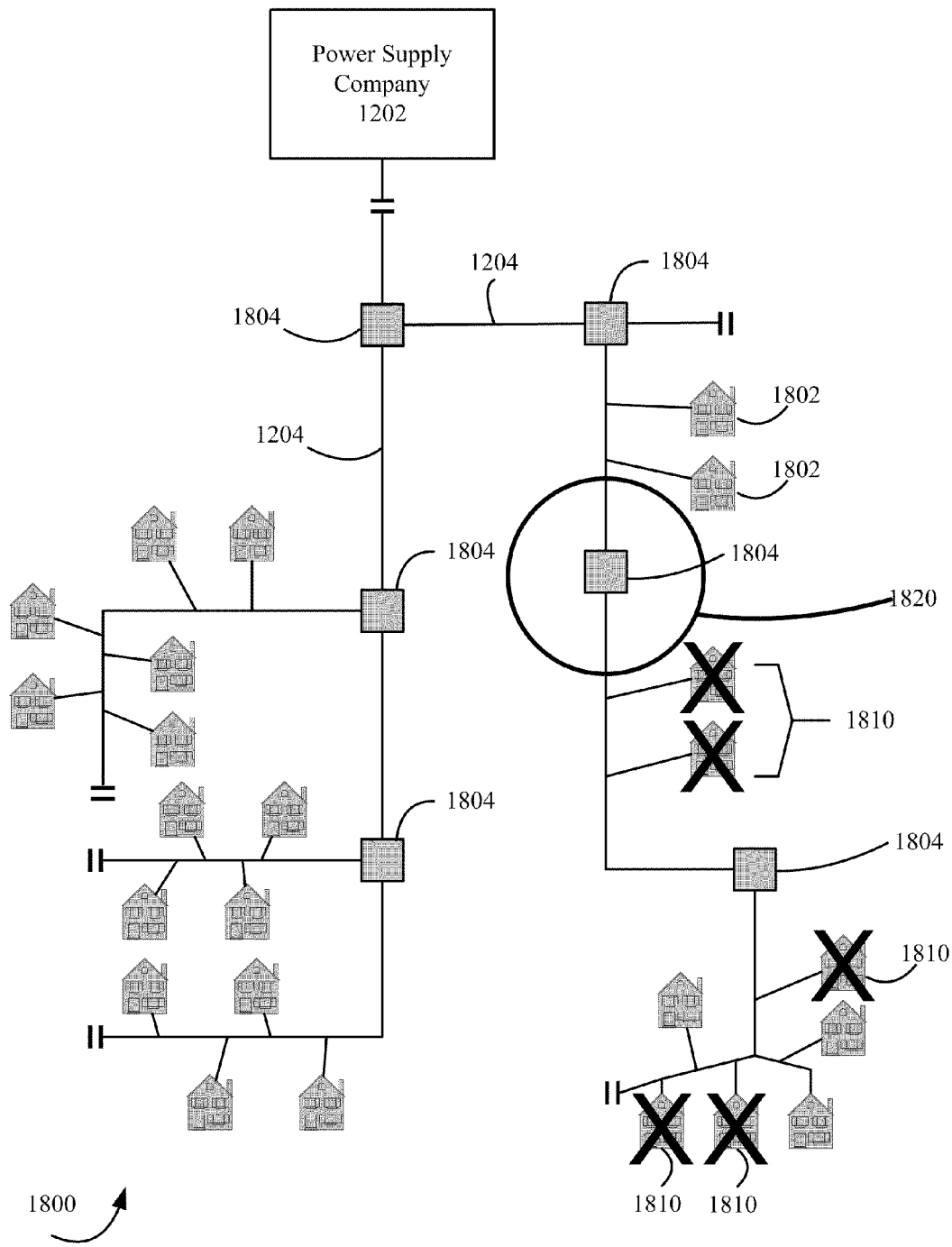
FIG. 18 is an example power network topology diagram illustrating affected addresses, according to an example embodiment.

FIG. 18 illustrates an example simplified power network grid topology 1800, according to one embodiment. According to this embodiment, the power network grid topology 1800 includes a power supply company 1202 or power generation station or substation and the power network 1204 extending electrical service to its customer endpoints 1802. Multiple power network components 1804 are shown in communication with the network 1204 at various locations. These power network components 1804 may be, but are not limited to, substations, transformers, splitters, converters, meters, and the like. The customer endpoints 1802 are represented by a house graphic, but may be any residential or commercial endpoint receiving power over the power network 1204. According to this illustrative example, a portion of the customer endpoints are represented as affected customer endpoints 1810 with an "X" indicating device inactivity. These affected customer endpoints 1810 represent the addresses of communications network components that were identified as inactive and potentially suffering from a power network failure. As described with reference to FIG. 17, communications network device addresses are identified and correlated with endpoints 1810 on the power network grid topology 1800 to locate the potential power network device or segment that may be causing the power network failure. In this example, the affected customer endpoints or addresses 1810 are the same inactive network device components illustrated by FIG. 14.

Therefore, with reference to FIG. 18, once the affected addresses 1810 that correlate with the inactive communications network devices are identified on the power network grid topology 1800, the network provider system may analyze the power network grid topology 1800 to identify one or more power network components or segments immediately upstream on the power network 1204 from the affected addresses 1810 that may be causing the power network failure. In this example, the power network component circled and labeled 1820 would be identified by the network provider system as potentially being the cause or point of interest on the power network.

In addition to identifying one or more locations or components on the power network that may be the cause of failure, in some embodiments, the address locations of one or more of the affected communications network devices may be overlaid or otherwise graphically indicated on a map of the power network grid topology, which may be in turn overlaid on a geographical map. This may be performed in the same or similar manner as representing POIs on a communications network topology, as described with reference to FIG. 9, with the additional detail of the power network grid topology graphically represented thereon.

Accordingly, in addition to identifying potential communications network service POIs, the previously described embodiments also provide for systems and methods for classifying service issues experienced by network devices on a communications network (e.g., POIs, etc.) as a possible power network failure instead of a communications network failure. A communications network provider system can advantageously analyze devices in communication with its communication network to determine whether a service issue results from a power network outage instead of a communications network outage by analyzing whether devices capable of battery back-up are communicating as active or online while others not capable of battery back-up are inactive. Once a power network is identified as being the cause for failure, the communications network provider can respond accordingly, realizing that the communications network is still operating as expected. By comparing the affected customer addresses to a power network grid topology, a communications network provider system can identify components or segments on the power network that may be responsible for the power network outage.

Because a communications network provider already has an installed base of devices that receive their primary power from a power network and are capable of reporting device status independent of the power network, a communications network is well-positioned to assess power network failures based on device status information received over its communications network. Whereas power companies are incurring massive expenses to install additional hardware to identify network statuses that may not otherwise be required a communications network provider may instead utilize its existing hardware to identify power network outages by more intelligently analyzing the device statuses and hardware types.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for locating a possible failure in a power network, comprising:
   identifying, by a network health analysis system comprising one or more computers, a possible failure occurring on a power network based on activity statuses for a plurality of network devices in communication with a communications network and adapted to receive at least primary power distributed by the power network, wherein identifying the possible failure occurring on the power network comprises identifying (a) at least one customer endpoint with at least one network device without battery back-up capabilities and having an inactive status and (b) at least one network device with battery back-up capabilities having an active status;
   determining, by the network health analysis system, location information for at least a portion of the plurality of network devices;
   analyzing, by the network health analysis system, the location information with a grid topology for the power network; and
   identifying one or more potential failure locations on the power network based on the analysis.

2. The method of claim 1, wherein the at least a portion of the plurality of network devices comprises network devices not receiving power from the power network.

3. The method of claim 2, wherein analyzing the location information with the grid topology for the power network comprises identifying one or more power network components or power network segments that are proximate to the network devices not receiving power from the power network.

4. The method of claim 2, wherein analyzing the location information with the grid topology for the power network comprises identifying one or more power network components or power network segments that are located upstream on the power network from the network devices not receiving power from the power network.

5. The method of claim 1, wherein analyzing the location information with the grid topology for the power network comprises:
   determining customer addresses for the at least a portion of the plurality of network devices;
   locating the customer addresses on the power network grid topology; and
   identifying at least one power network component or power network segment located on the power network upstream from the customer addresses as the one or more potential failure locations.

6. The method of claim 5, wherein the at least a portion of the plurality of network devices comprises network devices adapted to receive power from the power network but not receiving power from the power network.

7. The method of claim 1, wherein analyzing the location information with the grid topology for the power network comprises associating addresses for one or more of the plurality of network devices that are adapted to receive power from the power network but not receiving power from the power network with at least one of: (a) a power network grid topology map; or (b) a geographical map representing at least a portion of an area represented by the power network grid topology map.

8. The method of claim 1, wherein identifying the possible failure occurring on the power network comprises determining that one or more network devices are not powered by the power network but are powered by battery back-up and communicating over the communications network.

9. A system for locating a possible failure in a power network, comprising:
   a memory storing computer-executable instructions; and
   at least one processor in communication with the memory and operable to execute the computer-executable instructions to:
      identify a possible failure occurring on a power network based on activity statuses for a plurality of network devices in communication with a communications network and adapted to receive at least primary power distributed by the power network, wherein, when identifying the possible failure occurring on the power network, the processor is further operable to execute the computer-executable instructions to identify (a) at least one customer endpoint with at least one network device without battery back-up capabilities and having an inactive status and (b) at least one network device with battery back-up capabilities having an active status;
      determine location information for at least a portion of the plurality of network devices;
      analyze the location information with a grid topology for the power network; and
      identify one or more potential failure locations on the power network based on the analysis.

10. The system of claim 9, wherein the at least a portion of the plurality of network devices comprises network devices not receiving power from the power network.

11. The system of claim 10, wherein, when analyzing the location information with the grid topology for the power network, the processor is further operable to execute the computer-executable instructions to identify one or more power network components or power network segments that are proximate to the network devices not receiving power from the power network.

12. The system of claim 10, wherein, when analyzing the location information with the grid topology for the power network, the processor is further operable to execute the computer-executable instructions to identify one or more power network components or power network segments that are located upstream on the power network from the network devices not receiving power from the power network.

13. The system of claim 9, wherein, when analyzing the location information with the grid topology for the power network, the processor is further operable to execute the computer-executable instructions to:
   determine customer addresses for the at least a portion of the plurality of network devices;

locate the customer addresses on the power network grid topology; and identify at least one power network component or power network segment located on the power network upstream from the customer addresses as the one or more potential failure locations.

14. The system of claim 13, wherein the at least a portion of the plurality of network devices comprises network devices adapted to receive power from the power network but not receiving power from the power network.

15. A method for locating a possible power network failure, comprising:

determining, by a network health analysis system comprising one or more computers, that a possible power network failure exists based on a first plurality of network devices without battery back-up capabilities having an inactive status on a communications network and a second plurality of network devices with battery back-up capabilities having an active status on the communications network, wherein each of the first and the second pluralities of network devices is adapted for receiving at least primary power from a power network;

determining, by the network health analysis system, addresses for at least a portion of the first or the second pluralities of network devices;

locating, by the network health analysis system, the addresses on a power network grid topology for the power network; and identifying, by the network health analysis system, at least one power network component or power network segment as a possible power network failure location based on locations of the at least a portion of the first or the second pluralities of network devices.

16. The method of claim 15, wherein the addresses are determined based on communications network customer records.

17. The method of claim 15, wherein the at least one power network component or power network segment is located on the power network upstream from the addresses for the at least a portion of the first or second pluralities of network devices.

* * * * *